United States Patent
Choi et al.

(10) Patent No.: US 12,147,606 B2
(45) Date of Patent: *Nov. 19, 2024

(54) TACTILE STIMULUS PROVIDING SYSTEM

(71) Applicant: BHAPTICS INC., Daejeon (KR)

(72) Inventors: Sang Won Choi, Gyeonggi-do (KR); Ki Uk Gwak, Daejeon (KR)

(73) Assignee: BHAPTICS INC., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,213

(22) Filed: Nov. 1, 2023

(65) Prior Publication Data

US 2024/0061508 A1 Feb. 22, 2024

Related U.S. Application Data

(63) Continuation of application No. 17/777,535, filed as application No. PCT/KR2020/014330 on Oct. 20, 2020, now Pat. No. 11,841,730.

(30) Foreign Application Priority Data

Jan. 6, 2020 (KR) .......................... 10-2020-0001697

(51) Int. Cl.
*G06F 3/16* (2006.01)
*G06F 3/01* (2006.01)

(52) U.S. Cl.
CPC ................. *G06F 3/016* (2013.01); *G06F 3/16* (2013.01)

(58) Field of Classification Search
CPC .................................... G06F 3/016; G06F 3/16
See application file for complete search history.

(56) References Cited

U.S. PATENT DOCUMENTS 9,368,005 B2 6/2016 Cruz-Hernandez et al.
9,514,620 B2 12/2016 Bhatia
(Continued)

FOREIGN PATENT DOCUMENTS

CA 2742289 A1 * 5/2010 ........... B06B 1/0688
CA 2754705 A1 * 9/2010 ............... B06B 1/06
(Continued)

OTHER PUBLICATIONS

Extended European Search Report for the European Patent Application No. 20911539.3 issued by the European Patent Office on Dec. 13, 2023.
(Continued)

*Primary Examiner* — David E Choi
(74) *Attorney, Agent, or Firm* — IP & T GROUP LLP

(57) ABSTRACT

A tactile stimulation providing system includes: an apparatus for generating first actuator strength values corresponding to representative values of frequency bands of first audio data and second actuator strength values corresponding to representative values of frequency bands of second audio data; and an apparatus for driving actuators, based on the first actuator strength values and the second actuator strength values, wherein a number of the actuators is smaller than a number of the first and second actuator strength values, the first audio data includes information on a first direction, the second audio data includes information on a second direction, an actuator corresponding to first position information is driven based on only at least one of the first actuator strength values, and an actuator corresponding to second position information is driven based on only at least one of the second actuator strength values.

23 Claims, 24 Drawing Sheets

(56) References Cited

U.S. PATENT DOCUMENTS

| | | | |
|---|---|---|---|
| 9,619,029 B2 | 4/2017 | Lacroix et al. | |
| 11,120,674 B2 | 9/2021 | Yokoyama et al. | |
| 2015/0130706 A1* | 5/2015 | Lacroix | A63F 13/23 345/156 |
| 2015/0130707 A1 | 5/2015 | Da Costa et al. | |
| 2016/0080682 A1* | 3/2016 | Diaz | A63F 13/285 386/227 |
| 2017/0055055 A1* | 2/2017 | Albanese | H04H 20/86 |
| 2018/0284894 A1 | 10/2018 | Raut et al. | |
| 2019/0378385 A1 | 12/2019 | Biggs | |
| 2022/0331028 A1* | 10/2022 | Sternitzke | G05D 1/0094 |

FOREIGN PATENT DOCUMENTS

| | | | | |
|---|---|---|---|---|
| CN | 110769149 B * | 5/2021 | | G06F 3/04842 |
| JP | 2011-505921 A | 3/2011 | | |
| JP | 2014-049139 A | 3/2014 | | |
| JP | 2014-154126 A | 8/2014 | | |
| JP | 2015-053045 A | 3/2015 | | |
| JP | 2015-095264 A | 5/2015 | | |
| WO | 2009/076250 A1 | 6/2009 | | |
| WO | 2019/138867 A1 | 7/2019 | | |
| WO | WO-2021076094 A1 * | 4/2021 | | |
| WO | WO-2021141215 A1 * | 7/2021 | | A63F 13/285 |

OTHER PUBLICATIONS

Office Action for Japanese Patent Application No. 2022-533326 issued by the Japanese Patent Office on Jul. 23, 2024.

* cited by examiner

TACTILE STIMULUS PROVIDING SYSTEM

This application is a continuation of U.S. patent application Ser. No. 17/777,535 filed on Sep. 20, 2022, which is a national stage application of PCT/KR2020/014330 filed on Oct. 20, 2020, which claims priority of Korean patent application number 10-2020-0001697 filed on Jan. 6, 2020. The disclosure of each of the foregoing application is incorporated herein by reference in its entirety.

TECHNICAL FIELD

The present invention relates to a tactile stimulation providing system.

BACKGROUND ART

A tactile stimulation providing apparatus includes a plurality of actuators, and selectively vibrates a plurality of actuators, thereby providing a tactile stimulation to a user. When the user enjoys audiovisual-based contents such as a game and an image by using a mobile phone, a console, a computer, a virtual reality device, or the like, the user may experience more fun and immersion as such a tactile stimulation is transferred together with the contents to the user.

However, for example, when a tactile stimulation providing function is not built in a game from the development of a game program, it is necessary to newly research a method of providing a tactile stimulation suitable for each game situation by using an external program.

DETAILED DESCRIPTION OF INVENTION

Technical Problem

The present invention is conceived to solve the aforementioned problems. Accordingly, an object of the present invention is to provide a tactile stimulation providing system capable of providing a tactile stimulation suitable for a situation by using an external program.

Technical Solution

In accordance with an aspect of the present invention, there is provided a tactile stimulation providing system including: a tactile stimulation pattern generating apparatus configured to generate n first actuator strength values corresponding to representative values of frequency bands of first audio data and m second actuator strength values corresponding to representative values of frequency bands of second audio data; and a tactile stimulation providing apparatus including p actuators, the tactile stimulation providing apparatus driving the p actuators, based on the n first actuator strength values and the m second actuator strength values, wherein the n, m, and p are integers greater than 1, wherein the p is smaller than a value obtained by adding up the n and m, wherein the first audio data includes information on a first direction, wherein the second audio data includes information on a second direction different from the first direction, wherein an actuator corresponding to first position information corresponding to the first direction is driven based on only at least one of the first actuator strength values, and wherein an actuator corresponding to second position information corresponding to the second direction is driven based on only at least one of the second actuator strength values.

The first audio data may correspond to data of a first channel of stereo audio data, and the second audio data may correspond to data of a second channel of the stereo audio data.

The first audio data may correspond to data of a first channel of surround audio data having three or more channels, and the second audio data may correspond to data of a second channel of the surround audio data.

At least one actuator among the p actuators may be driven based on at least one of the n first actuator strength values and at least one of the m second actuator strength values.

At least one actuator among the p actuators may be driven based on at least two of the n first actuator strength values.

At least two of the frequency bands may overlap with each other in at least a partial range.

The tactile stimulation pattern generating apparatus may include a data converter configured to convert the first audio data and the second audio data of a time domain respectively into first converted data and a second converted data of a frequency domain.

The tactile stimulation pattern generating apparatus may further include a band representative value calculator configured to calculate the representative values of the frequency bands with respect to each of the first converted data and the second converted data. The representative values may be based on valid data which are greater than a lowest threshold value of each of the frequency bands and are smaller than a highest threshold value of each of the frequency bands.

The tactile stimulation pattern generating apparatus may further include an actuator strength calculator configured to calculate actuator strength values corresponding to the representative values.

The actuator strength calculator may calculate the actuator strength values to become smaller as the representative values become smaller, and calculate the actuator strength values to become smaller as the representative values become larger.

In the actuator strength calculator, a relationship of the representative values and the actuator strength values may include a discontinuous function.

A first lowest threshold value corresponding to a first frequency band among the frequency bands may be different from a second lowest threshold value corresponding to a second frequency band among the frequency bands. A first highest threshold value corresponding to the first frequency band may be different from a second highest threshold value corresponding to the second frequency band.

The tactile stimulation pattern generating apparatus may further include an actuator strength attenuator configured to gradually attenuate the actuator strength values, when the actuator strength values are maintained for a certain time or more.

The tactile stimulation pattern generating apparatus may further include an actuator strength merger configured to generate one actuator strength value by merging two or more actuator strength values mapped to one actuator.

The tactile stimulation pattern generating apparatus may further include an automatic setting unit configured to calculate a valid range of the representative values, based on a frequency distribution of the representative values according to a lapse of time, with respect to each of the frequency bands, set the lowest threshold value to correspond to a minimum value of the valid range, and set the highest threshold value to correspond to a maximum value of the valid range.

In accordance with another aspect of the present invention, there is provided a computer readable recording medium recording a program capable of being executed by a computer, wherein the program generates a user interface, wherein the user interface includes: a channel setting area including frequency bands of at least one audio channel among two or more audio channels; and a local setting area including local setting values of a selected frequency band among the frequency bands, and wherein the local setting values include virtual actuators selected corresponding to the selected frequency band among a plurality of virtual actuators.

The local setting values may include a highest threshold value as an upper limit of valid data of the selected frequency band and a lowest threshold value as a lower limit of the valid data of the selected frequency band.

The user interface may further include a global setting area including global setting values commonly applied to the frequency bands.

The user interface may further include a mode selection area in which one of a stereo audio mode having two audio channels and a surround audio mode having three or more audio channels is selectable.

The user interface may further include a simulation area in which driving strengths of the virtual actuators are visualized corresponding to input audio data.

Advantageous Effects

The tactile stimulation providing system in accordance with the present invention can provide a tactile stimulation suitable for a situation by using an external program.

MODE FOR THE INVENTION

Figure 1:
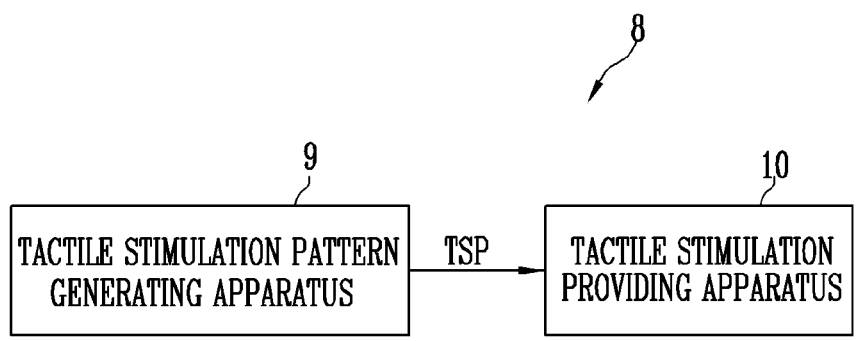
FIG. 1 is a view illustrating a tactile stimulation providing system in accordance with an embodiment of the present invention.

Hereinafter, exemplary embodiments are described in detail with reference to the accompanying drawings so that those skilled in the art may easily practice the present invention. The present invention may be implemented in various different forms and is not limited to the exemplary embodiments described in the present specification.

A part irrelevant to the description will be omitted to clearly describe the present invention, and the same or similar constituent elements will be designated by the same reference numerals throughout the specification. Therefore, the same reference numerals may be used in different drawings to identify the same or similar elements.

In addition, the size and thickness of each component illustrated in the drawings are arbitrarily shown for better understanding and ease of description, but the present invention is not limited thereto. Thicknesses of several portions and regions are exaggerated for clear expressions.

Referring to FIG. 1, a tactile simulation providing system 8 in accordance with an embodiment of the present invention includes a tactile stimulation pattern generating apparatus 9 and a tactile stimulation providing apparatus 10.

The tactile stimulation pattern generating apparatus 9 may generate n first actuator strength values corresponding to representative values of frequency bands of first audio data and m second actuator strength values corresponding to representative values of frequency bands of second audio data. The tactile stimulation pattern generating apparatus 9 may provide the tactile stimulation providing apparatus 10 with a tactile stimulation pattern TSP based on the first actuator strength values and the second actuator strength values.

In accordance with an embodiment, the first audio data may correspond to data of a first channel of stereo audio data, and the second audio data may correspond to data of a second channel of the stereo audio data.

In accordance with another embodiment, the first audio data may correspond to data of a first channel of surround audio data having three or more channels, and the second audio data may correspond to data of a second channel of the surround audio data. The surround audio data may correspond to the existing 5.1 channel surround audio data, the existing 7.1 channel surround audio data, or the like.

In accordance with the above-described embodiments, original audio data of a time domain are not used as they are, but representative values of specific frequency bands of a frequency domain are used. Therefore, an amount of data about each of audio channels included in the tactile stimulation pattern TSP decreases. That is, when assuming that a data transmission rate from the tactile stimulation pattern generating apparatus 9 to the tactile stimulation providing apparatus 10 is fixed, transmission of the tactile stimulation pattern TSP including data about a larger number of audio channels is possible. Thus, the tactile stimulation providing system 8 in accordance with the embodiment of the present invention can respond to various audio modes including a stereo audio mode of two channels, a surround audio mode of 5.1 channels, a surround audio mode of 7.1 channels, and the like.

The tactile stimulation providing apparatus 10 includes p actuators, and may drive the p actuators, based on the n first actuator strength values and the m second actuator strength values.

Here, the n, m, and p may be integers greater than 1. The p may be smaller than a value obtained by adding up the n and m. That is, when actuator strength values are mapped to actuators, a number of the actuator strength values may be greater than a number of the actuators. In this case, at least one actuator may be driven based on at least two actuator strength values.

For example, at least one actuator among the p actuators may be driven based on at least one of the n first actuator strength values and at least one of the m second actuator strength values. That is, when a driving strength of at least one actuator is determined, the driving strength may be determined based on both the first audio data and the second audio data.

Also, for example, at least one actuator among the p actuators may be driven based on at least two of the n first actuator strength values. That is, when a driving strength of at least one actuator is determined, the driving strength is determined based on only the first audio data, and may be determined based on representative values of at least two frequency bands.

In accordance with the above-described embodiment, the directionality of a sound may be emphasized according to positions of actuators, or a sound characteristic with respect to actuators may be emphasized. A directionality emphasis effect according to positions of actuators will be described later with reference to FIG. 24. A sound characteristic emphasis effect with respect to actuators will be described later with reference to FIG. 18.

In embodiments of the present invention, the actuator strength value or the driving strength does not mean only a one-time vibration magnitude of an actuator. The actuator strength value or the driving strength may be variously implemented by appropriately adjusting a one-time vibration magnitude, a driving time, a driving frequency, a driving pattern, and the like.

In accordance with an embodiment, the tactile stimulation pattern generating apparatus 9 may generate the tactile stimulation pattern TSP through a user interface including a plurality of virtual actuators to which positions of a plurality of actuators are mapped.

The tactile stimulation pattern generating apparatus 9 may be a computer including at least one processor and at least one memory to perform information processing. The tactile stimulation pattern generating apparatus 9 may perform a desired function by reading a recording medium in which data or program is recorded.

The recording medium includes all kinds of recording devices in which data or programs can be stored. Examples of the computer readable recording medium include a ROM, a RAM, a CD-ROM, a magnetic tape, a floppy disk, an optical data storage device, a hard disk, an external hard disk, an SSD, a USB storage device, a DVD, a Blu-ray disk, and the like. Also, the computer readable recording medium may be a combination of a plurality of devices, and be distributed to computer systems connected through a network. The recording medium may be a non-transitory computer readable recording medium. The non-transitory computer readable recording medium is not a medium which stores data or programs temporarily such as a register, cache or memory but means a medium which stores data or programs semi-permanently and can be read by a computer.

The user interface may be implemented with a display device for displaying visual information to a user and an input device for receiving an input of the user. The display device may include a monitor, a TV, a projector, a mobile display, and the like. The input device may include a mouse, a keyboard, a touch pad, a microphone, a vision sensor, and the like. The display device and the input device are not necessarily separated from each other. For example, the display device and an input device may be integrally implemented such as a touch display device.

The plurality of actuators means a plurality of tactile stimulation providing modules which physically exist in the tactile stimulation providing apparatus 10. Each of the plurality of actuators may be a vibration motor as one of electric actuators. Hereinafter, although a case where each of the plurality of actuators is the vibration motor is described as an example, each of the plurality of actuators may be a pneumatic, hydraulic, EAP (electroactive polymer), or piezoelectric actuator. Each of the plurality of actuators may be an electrostimulation or temperature transmission device. Therefore, one kind or a plurality kind of actuators may be applied to the present invention.

The user interface includes a plurality of virtual actuators to which positions of a plurality of actuators are mapped. The user interface may be graphically displayed such that the user can intuitively recognize a physical arrangement of the plurality of actuators included in the tactile stimulation providing apparatus 10. For example, when the tactile stimulation providing apparatus 10 includes a plurality of actuators of five rows and five columns, the user interface may include a plurality of virtual actuators of five rows and five columns. In another example, when the tactile stimulation providing apparatus 10 includes a plurality of actuators of one row and five columns, the user interface may include a plurality of virtual actuators of one row and five columns.

In another embodiment, the plurality of actuators of the tactile stimulation providing apparatus 10 and the plurality of virtual actuators of the user interface may not correspond one-to-one to each other. For example, a tactile stimulation pattern generated with respect to a plurality of virtual actuators of one row and five columns in the tactile stimulation pattern generating apparatus 9 may correspond to one row among the plurality of actuators of five rows and five columns in the tactile stimulation providing apparatus 10. Therefore, a method of matching a plurality of actuators and a plurality of virtual actuators may vary in some embodiments.

The tactile stimulation pattern TSP generated in the tactile stimulation pattern generating apparatus 9 may be data or a program, which is provided as an input of the tactile stimulation providing apparatus 10.

The tactile stimulation providing apparatus 10 includes a plurality of actuators, and drives a plurality of actuators according to the generated tactile stimulation pattern TSP. A driving time, a driving frequency, a driving strength, a driving distance, and the like of the plurality of actuators are adjusted according to the tactile stimulation pattern, so that the user of the tactile stimulation providing apparatus 10 can feel various tactile stimulations.

Figure 2:
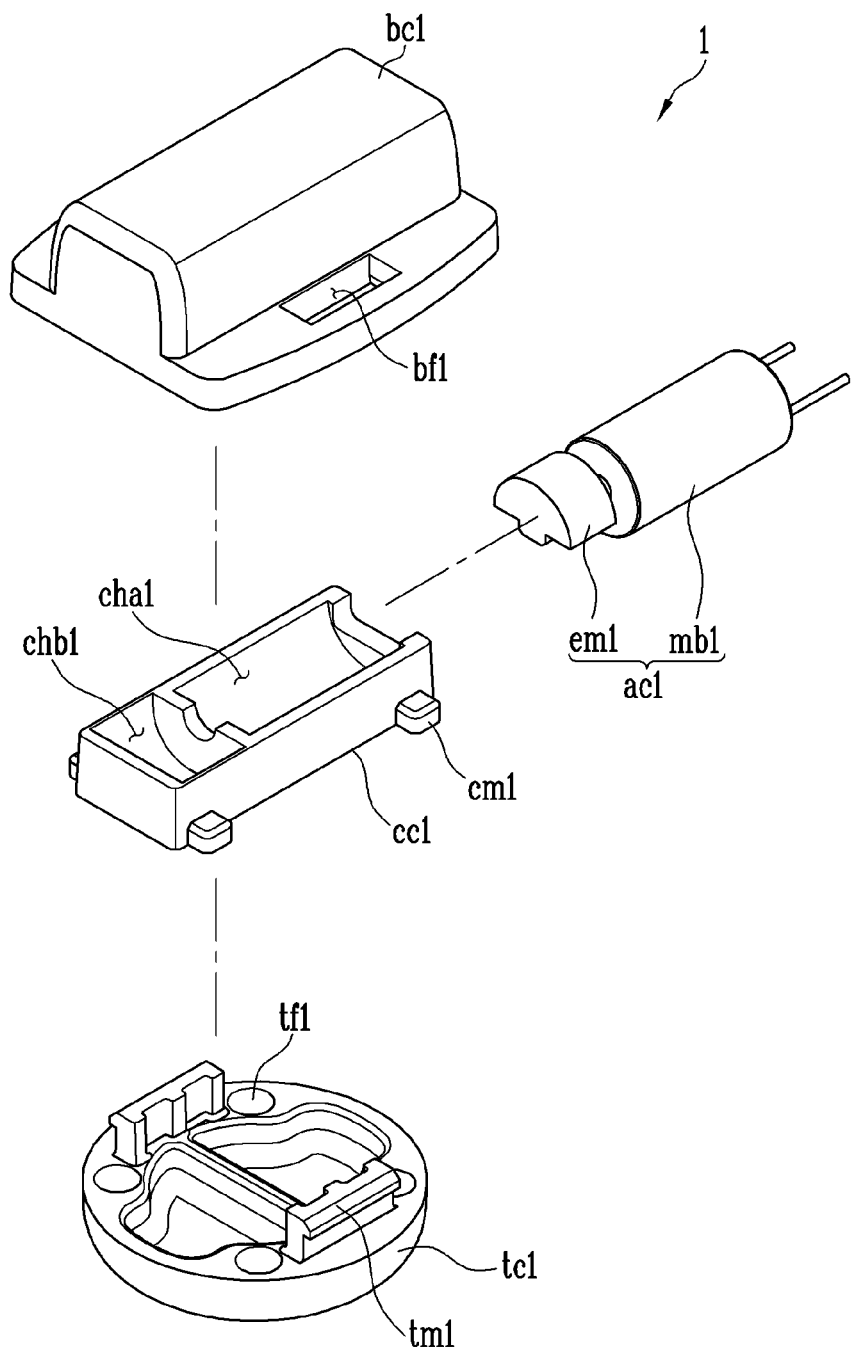
FIG. 2 is a view illustrating an actuator case at a point of view in accordance with an embodiment of the present invention.
Figure 3:
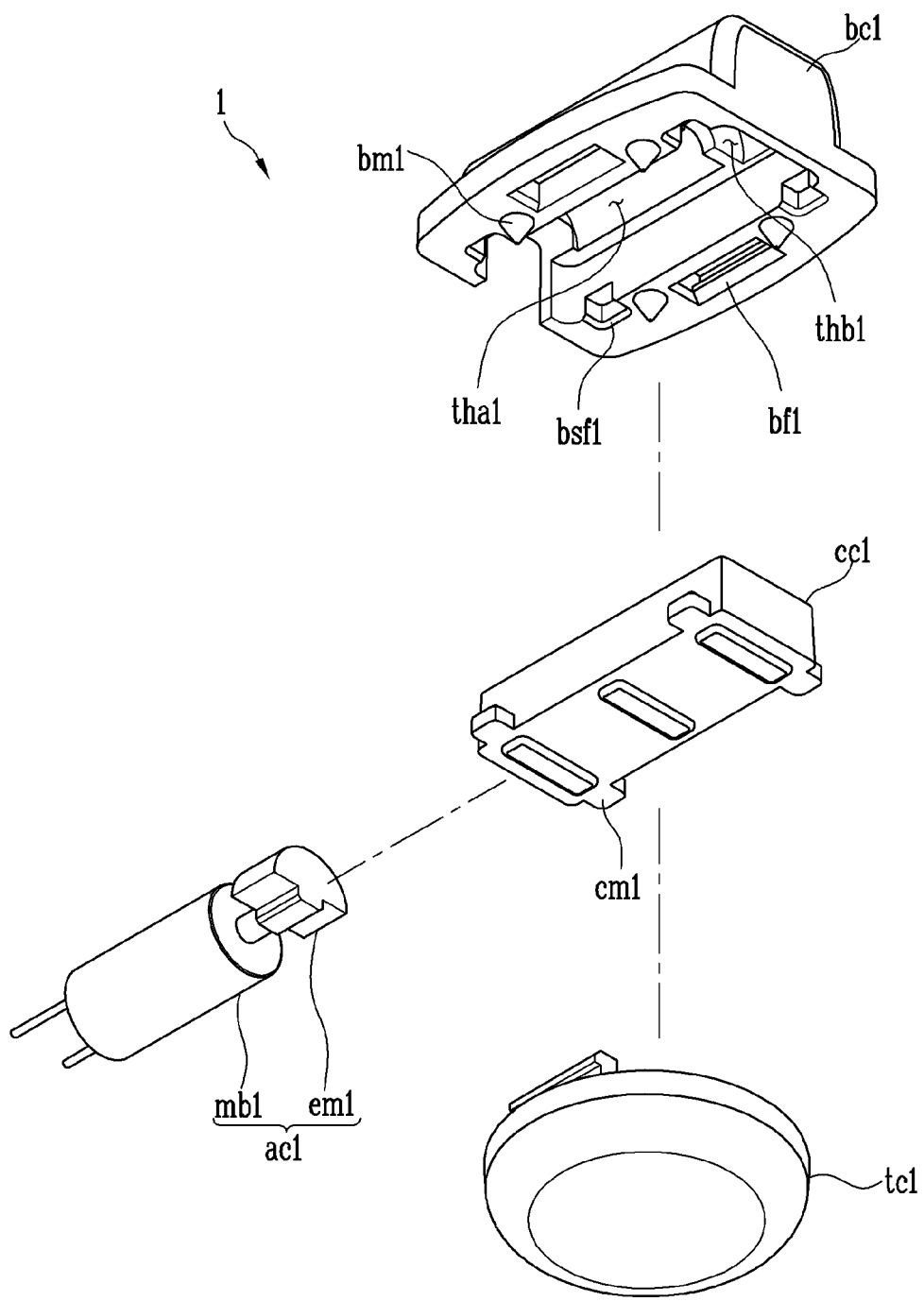
FIG. 3 is a view illustrating the actuator case shown in FIG. 2 at another point of view.

FIG. 2 is a view illustrating an actuator case at a point of view in accordance with an embodiment of the present invention. FIG. 3 is a view illustrating the actuator case shown in FIG. 2 at another point of view.

Referring to FIGS. 2 and 3, the actuator case 1 in accordance with the embodiment of the present invention includes a bottom case bc1, a cover case cc1, and a top case tc1.

A position relationship of the bottom case bc1, the cover case cc1, and the top case tc1 may be determined based on a base band. The base band may be located between the cover case cc1 and the top case tc1. A relative position relationship of the base band and the actuator case 1 will be described with reference to FIGS. 3 and 4.

An actuator ac1 is located on one surface of the base band, and includes a driver mb1 and an eccentric mass em1. The driver mb1 and the eccentric mass em1 may be rotatably connected to each other through a shaft. The actuator act may be an ERM motor (eccentric rotation motor). The actuator act may generate a vibration when the eccentric mass em1 rotated by the driver mb1 serves as an imbalanced vibrator. The actuator act may be a cylindrical vibration motor which has a diameter of about 6 mm and has a total height of about 17 mm. While a coin-shaped motor generates a vibration in a horizontal direction when a vibrator is rotated horizontally, the actuator act of this embodiment may generate a vibration in a vertical direction.

The bottom case bc1 is located on the one surface of the base band, and includes a first accommodation part that for accommodating the driver mb1 and a second accommodation part thb1 for accommodating the eccentric mass em1. That is, the bottom case bc1 may accommodate the whole or a portion of the actuator ac1 except a line. In some embodiments, when the bottom case bc1 accommodates only a portion of the actuator ac1, the other portion of the actuator ac1 may be accommodated by the cover case cc1 which will be described later.

The cover case cc1 is located on the one surface of the base band, and is coupled to the bottom case bc1 to allow the driver mb1 to be adhered closely to the first accommodation part that.

Referring to FIGS. 2 and 3, the cover case cc1 may be coupled to the bottom case bc1 while covering the actuator ac1. A male fastening part cm1 of the cover case cc1 is fitted into a female fastening part bsf1 of the bottom case bc1, so that the cover case cc1 can be firmly fixed to the bottom case bc1. In particular, the first accommodation part that and an accommodation part chat may be formed such that the driver mb1 of the actuator ac1 can be firmly fixed. The male fastening part cm1 of the cover case cc1 may protrude such that the cover case cc1 is parallel to the surface on which the cover case cc1 is in contact with the base band. In this embodiment, four pairs of the male fastening parts cm1 and the female fastening parts bsf1 are provided. However, the number of the male fastening parts cm1 and the female fastening parts bsf1 may vary in some embodiments.

The cover case cc1 is coupled to the bottom case bc1, to form, along with the second accommodation part thb1, an extra rotating space of the eccentric mass em1 while allowing the eccentric mass em1 to be spaced apart from the one surface of the base band. That is, an accommodation part chb1 of the cover case cc1 is matched to the second accommodation part thb1, to form an extra rotating space which does not interfere with rotation of the eccentric mass em1. Also, the accommodation part chb1 of the cover case cc1 functions to allow the eccentric mass em1 to be spaced apart from the one surface of the base band. Thus, even when the base band is made of a flexible cloth or rubber material, the eccentric mass em1 can be reliably rotated without colliding with the base band.

The top case tc1 is located on the other surface of the base band, and allows the bottom case bc1 to be fixed to the base band.

A male fastening part tm1 of the top case tc1 is coupled to a female fastening part bf1 while penetrating the base band, so that the actuator ac1 and the actuator case 1 can be fixed to the base band. The base band may include an opening having a shape through which the male fastening part tm1 can pass. In some embodiments, an area of the top case tc1 adhered closely to the other surface of the base band may be smaller than that of the bottom case bc1 adhered closely to the one surface of the base band. In this case, a space in which the male fastening part tm1 can be located is relatively insufficient. Hence, in this embodiment, two pairs of the male fastening parts tm1 and the female fastening parts bf1 are provided. In accordance with this embodiment, when the area of the top case tc1 is smaller than that of the bottom case bc1, a distance between a plurality of top cases, on which vibrations of a plurality of actuators are concentrated is sufficient even though the plurality of actuators are densely arranged. Hence, a resolution of vibrations that a user actually feels can be increased. Also, in this embodiment, one surface of the top case tc1 is configured in a circular shape, so that the user does not feel any corner, thereby providing more comfortable feeling.

The bottom case bc1 may include a protrusion part bm1, and the top case tc1 may include a recessed part tf1. The protrusion part bm1 of the bottom case bc1 is fitted into the recessed part tf1 while pressurizing the base band, so that the actuator ac1 and the actuator case 1 can be more firmly fixed to the base band. In this embodiment, since the area of the top case tc1 is relatively small, four pairs of the protrusion parts bm1 and the recessed parts tf1 are provided.

Figure 4:
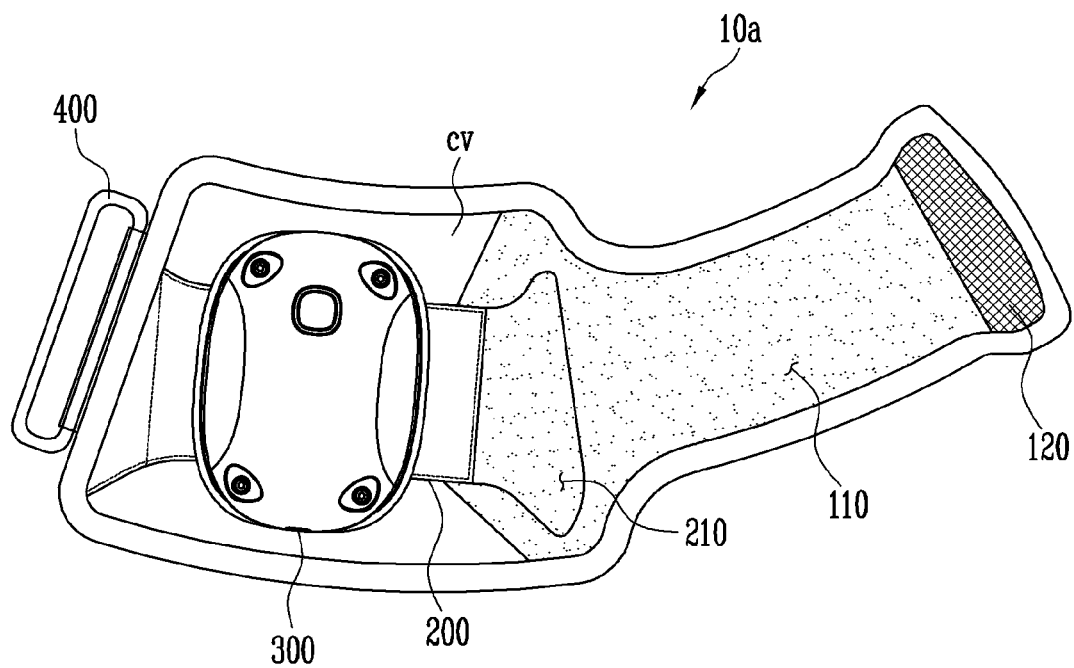
FIG. 4 is a front view of a tactile stimulation providing apparatus formed in the shape of an arm warmer in accordance with an embodiment of the present invention.
Figure 5:
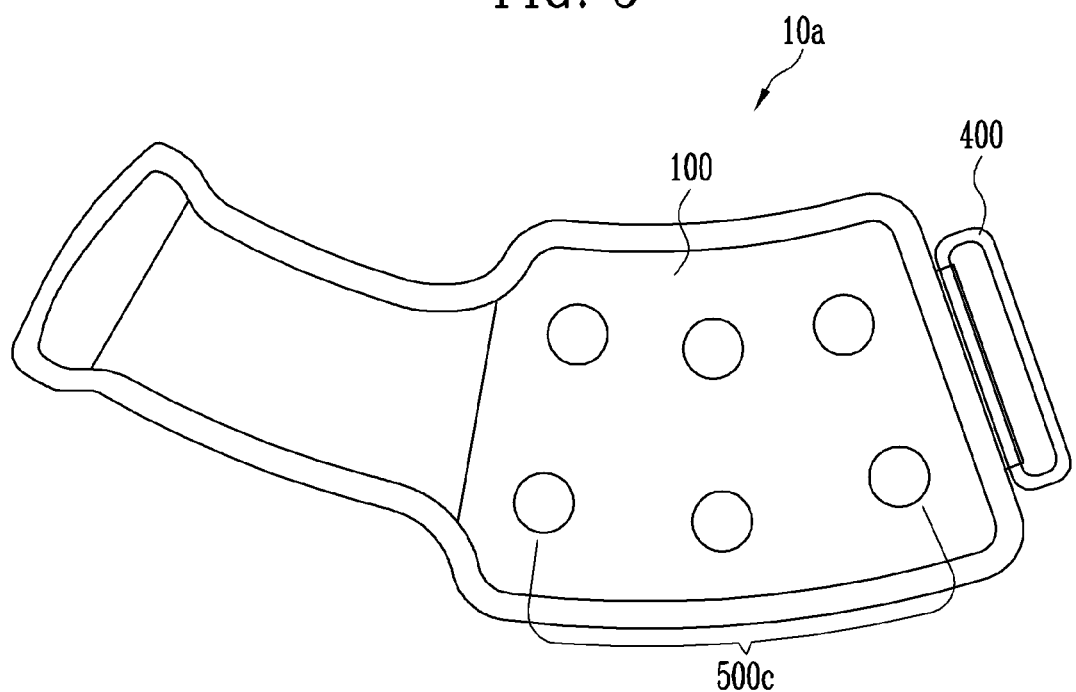
FIG. 5 is a rear view of the tactile stimulation providing apparatus shown in FIG. 4.

FIG. 4 is a front view of a tactile stimulation providing apparatus formed in the shape of an arm warmer in accordance with an embodiment of the present invention. FIG. 5 is a rear view of the tactile stimulation providing apparatus shown in FIG. 4.

Referring to FIGS. 4 and 5, the tactile stimulation providing apparatus 10 formed in the shape of an arm warmer in accordance with the embodiment of the present invention may include a base band 100, a plurality of actuators, a plurality of bottom cases, a plurality of cover cases, and a plurality of top cases 500c. In some embodiments, the tactile stimulation providing apparatus 10 may selectively further include an auxiliary band 200, a controller case 300, a ring 400, a controller, and a signal transmission member.

The plurality of top cases 500c may be located on a rear surface of the base band 100. The plurality of bottom cases and the plurality of cover cases may be located on a front surface of the base band 100. The plurality of bottom cases and the plurality of cover cases may be covered by a protective cover CV and detachable members 110 and 120. Each of the plurality of actuators may be interposed between a corresponding bottom case and a corresponding cover case. Therefore, the base band 100 may support the plurality of actuators.

A flexible material such as a cloth material, a mesh material, a rubber material, or neoprene may be used for the base band 100. Since users have various shapes and sizes with respect to the same body part, comfortable wearing sensation can be provided to the users, when the flexible material is used for the base band 100. The base band 100 may be configured in a single layer. However, in a preferred embodiment, the base band 100 may be configured in a plurality of layers. The plurality of layers may be made of different materials. For example, the rear surface of the base band 100 may be configured in a layer made of a mesh material, and the front surface of the base band 100 may be configured in a layer made of a neoprene material. The plurality of actuators may be located on the rear surface of the base band 100, which is made of the mesh material. The mesh material does not propagate vibrations of the plurality of actuators, and does not interfere with movements of the plurality of actuators. In addition, the front surface of the base band 100, which is made of the neoprene material, can prevent vibrations generated from the plurality of actuators from reaching the controller case 300.

The detachable member 110 may be located on the front surface of the base band 100. In addition, the detachable member 120 may be located at the other end of the front surface of the base band 100 to be spaced apart from the detachable member 110, and be detachable from the detachable member 110.

The detachable member 110 may be a detachable member of type A, and the detachable member 120 may be a detachable member of type B.

In this embodiment, a detachable member may be of any one of the type A and the type B. The type A and the type B may be detachable from each other. However, the type A and the type A may not be detachable from each other. Similarly, the type B and the type B may not be detachable from each other. All kinds of detachable members having these types may be used as the detachable member of this embodiment. Examples of the detachable member may be Velcro, a magnet, an electromagnet, a snap button, buckle, and the like. A case where the detachable member is Velcro is assumed and illustrated in drawings of the following embodiments.

An upper edge and a lower edge of the base band 100 may have a streamline shape. The unfolded shape of the base band 100 becomes a streamline shape such as a planar figure of a truncated cone, so that the base band 100 can be adhered more closely to an arm of a user when the base band 100 is rolled around the arm of the user.

The auxiliary band 200 may include a detachable member (not shown) of the type B, which is detachable from the detachable member 110 on a rear surface thereof, and one end of the auxiliary band 200 may be connected to one end of the base band 100.

The auxiliary band 200 separates the controller case 300 from the base band 100, so that vibrations of the plurality of actuators located at the base band 100 are not propagated to the controller case 300, thereby preventing noise. Also, the auxiliary band 200 adjusts a relative attachment position of the detachable member on the rear surface thereof and the detachable member 110, so that the position of the controller case 300 can be adjusted to fit a body type of a user.

A detachable member 210 is located on a front surface of the auxiliary band 200, and is detachable from the detachable member 120. The detachable member 210 may be a detachable member of the type A. Thus, when a user wears the tactile stimulation providing apparatus 10, the detachable member 120 is detachable from not only the detachable member 110 but also the detachable member 210, and accordingly, the tactile stimulation providing apparatus 10 can fit various body types of users.

In accordance with an embodiment, a width of the other end of the auxiliary band 200 may be greater than that of the inner circumference of an opening of the controller case 300. For example, the other end of the auxiliary band 200 may have a trumpet shape or hook shape. Thus, the controller case 300 is not easily escaped from the auxiliary band 200.

The ring 400 may be connected to the one end of the base band 100. A width of the other end of the base band 100 may be greater than that of the inner circumference of the ring 400. For example, the other end of the base band 100 may have a trumpet shape or hook shape. In accordance with this embodiment, when a user removes the tactile stimulation providing apparatus 10 from an arm thereof, the other end of the base band 100 is caught by the ring 400, so that the tactile stimulation providing apparatus 10 can be prevented from suddenly falling. Further, the base band 100 maintains a state in which the other end of the base band 100 is caught by the ring 400, so that a process in which a next user again inserts the other end of the base band 100 into the ring 400 when the next user wears the tactile stimulation providing apparatus 10 can be omitted. Since the base band 100 has elasticity, a user enables the other end of the base band 100 to pass through the ring 400 by bending the other end of the base band 100, when the user wears the tactile stimulation providing apparatus 10.

The plurality of top cases 500c may be exposed to the outside. The plurality of top cases 500c exposed to the outside may be adhered closely to an arm of a user. Each of the plurality of top cases 500c propagates a driving force of a corresponding actuator to a body of a user, so that the user can feel a tactile stimulation.

The controller may be located in the controller case 300, and generate a driving signal for controlling the plurality of actuators. The controller may include a microcontroller, a motor driver, a power management module, and the like. A separate battery for driving the controller may be located in the controller case 300. The controller may be configured in the form of a PCB, an FPCB, an IC, etc. Also, the controller may receive a tactile stimulation pattern input through the existing wireless communication techniques including Bluetooth, Wi-Fi, and the like or through the existing wired communication techniques. The tactile stimulation pattern may be a multidirectional tactile stimulation pattern. A separate memory device may be located in the controller case 300.

The signal transmission member may transmit a driving signal to the plurality of actuators from the controller. The signal transmission member may be configured with an FPCB or a material such as a wire. The signal transmission member may electrically connect the plurality of actuators to the controller. Each of the base band 100, the auxiliary band 200, and the controller case 300 may include an opening such that the signal transmission member passes therethrough.

Figure 6:
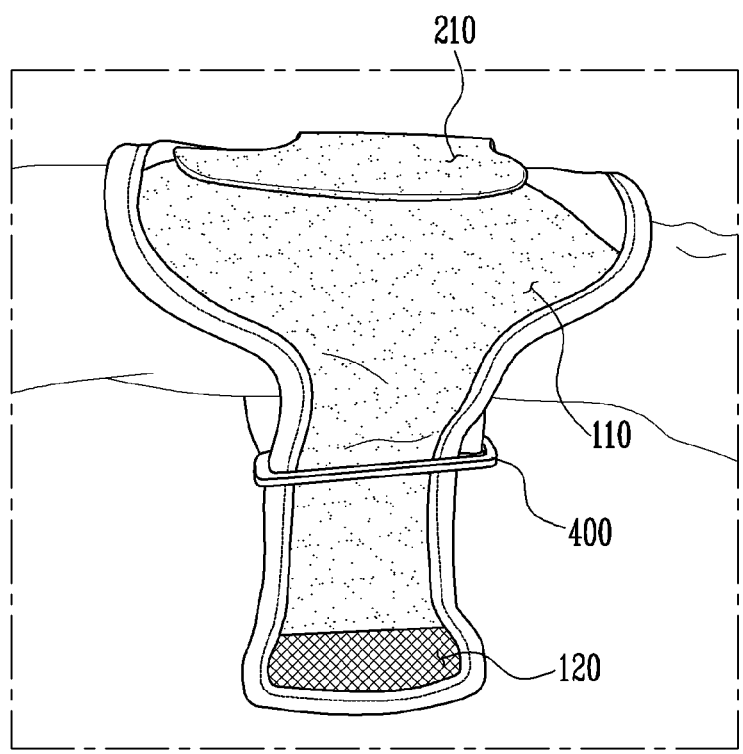
FIG. 6 is a view illustrating a point of view where a user is wearing the tactile stimulation providing apparatus shown in FIG. 4.

FIG. 6 is a view illustrating a point of view where a user is wearing the tactile stimulation providing apparatus shown in FIG. 4.

Referring to FIG. 6, the user is wearing the tactile stimulation providing apparatus 10 on a body thereof. FIG. 6 illustrates in a state in which the tactile stimulation providing apparatus 10 is put on the body of the user, and one end of the tactile stimulation providing apparatus 10, which includes the detachable member 120, passes through the ring 400.

Figure 7:
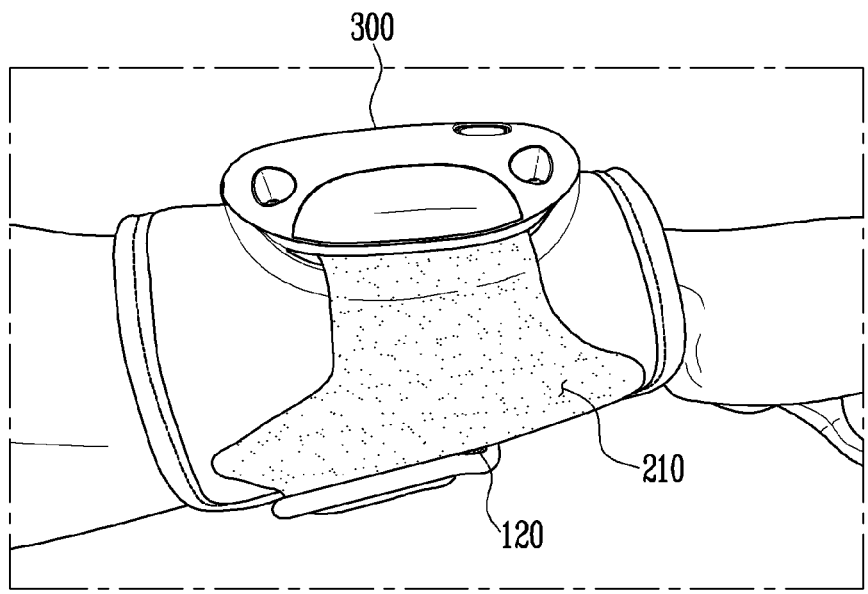
FIG. 7 is a view illustrating a point of view where a user has worn the tactile stimulation providing apparatus shown in FIG. 4.

FIG. 7 is a view illustrating a point of view where a user has worn the tactile stimulation providing apparatus shown in FIG. 4.

Referring to FIG. 7, the user attaches the detachable member 120 of the tactile stimulation providing apparatus 10 to the detachable member 210, so that the tactile stimulation providing apparatus 10 is fixed to a body of the user. When the thickness of a body part of the user, on which the tactile stimulation providing apparatus 10 is worn, is thicker, the detachable member 120 may be attached to the detachable member 110. Thus, the detachable member 120 is attachable to the detachable member 110 or the detachable member 210, to handle various bodies of users.

Figure 8:
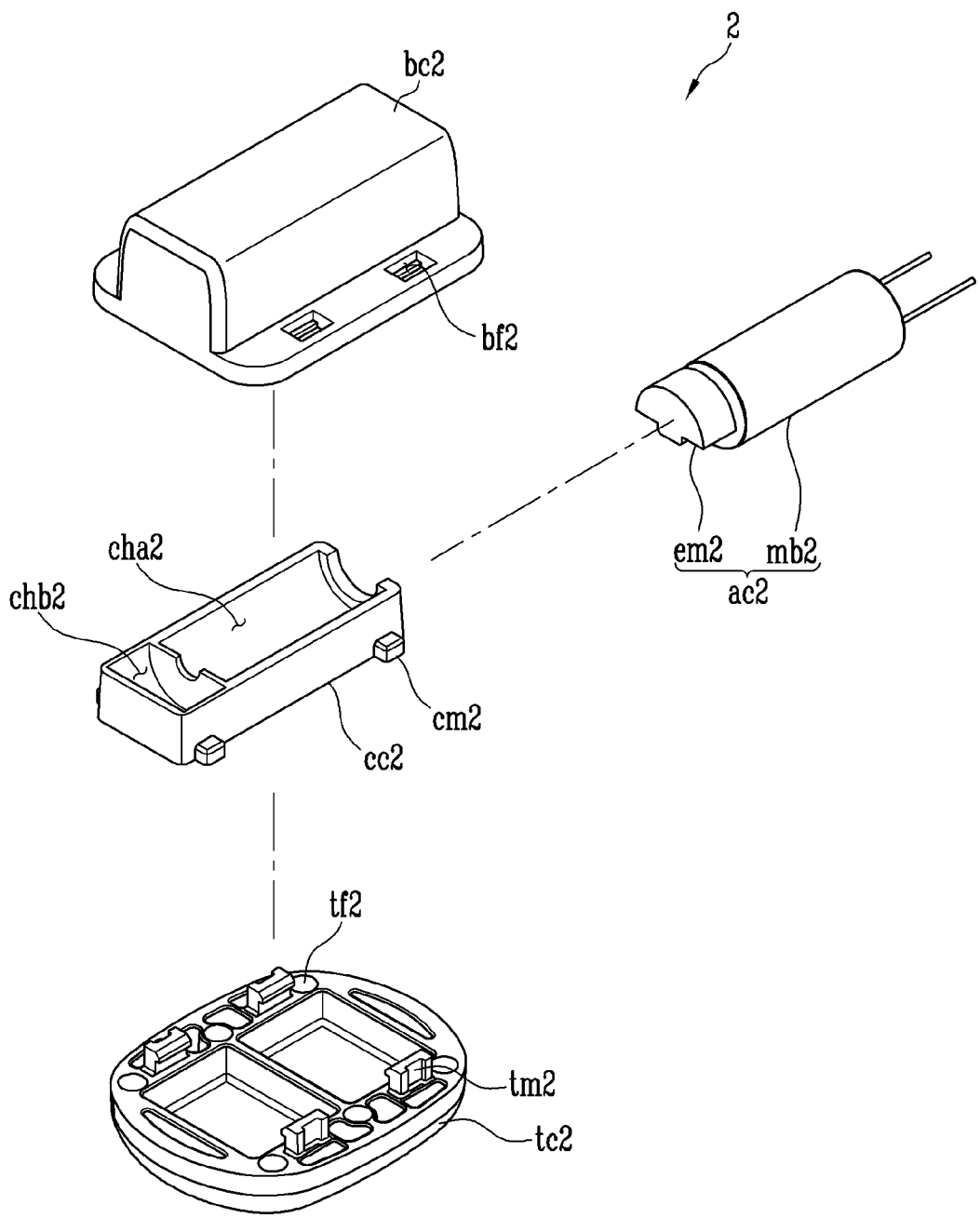
FIG. 8 is a view illustrating an actuator case at a point of view in accordance with another embodiment of the present invention.
Figure 9:
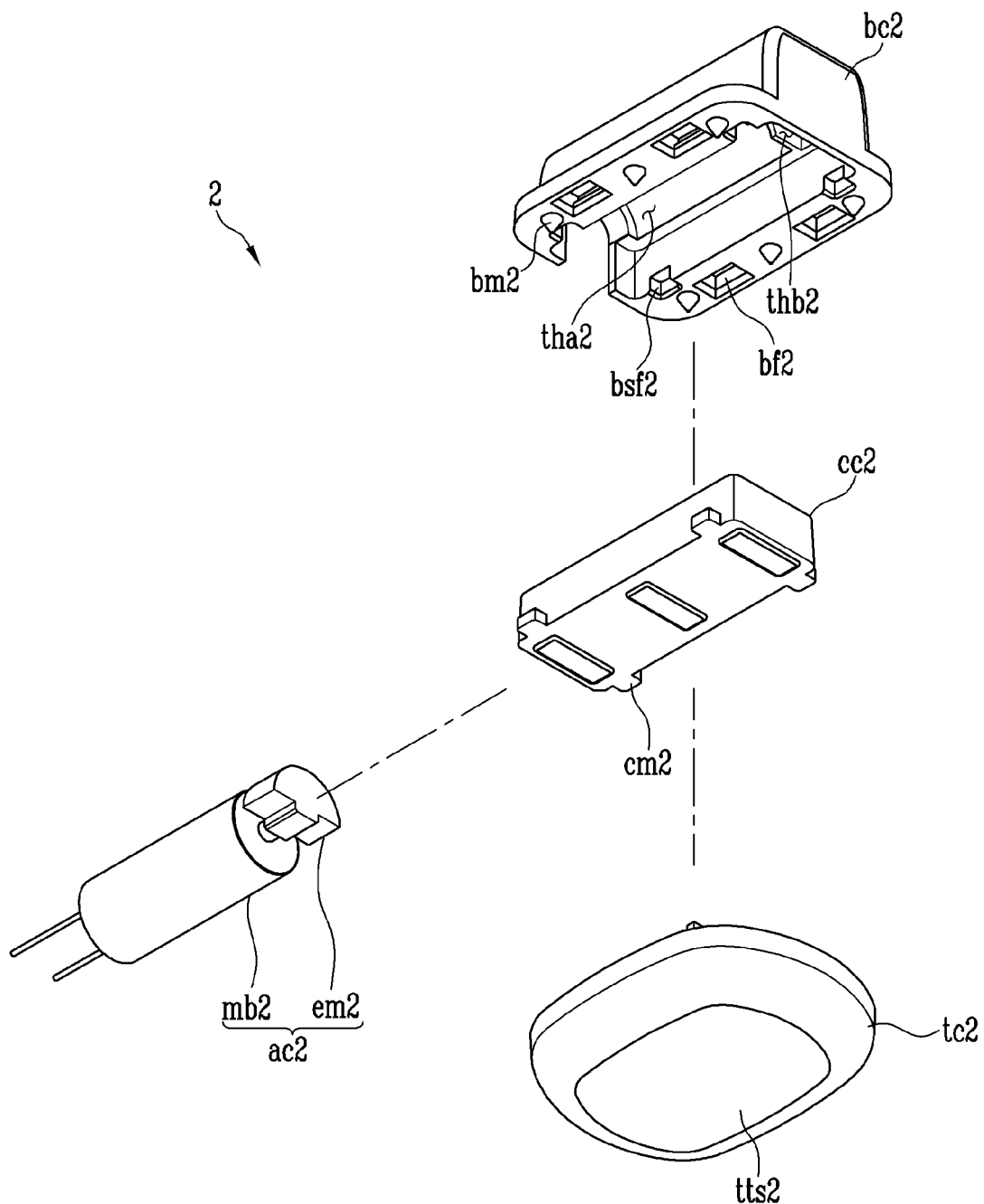
FIG. 9 is a view illustrating the actuator case shown in FIG. 8 at another point of view.

FIG. 8 is a view illustrating an actuator case at a point of view in accordance with another embodiment of the present invention. FIG. 9 is a view illustrating the actuator case shown in FIG. 8 at another point of view.

Referring to FIGS. 8 and 9, the actuator case 2 in accordance with the another embodiment of the present invention may include a bottom case bc2, a cover case cc2, and a top case tc2.

A position relationship of the bottom case bc2, the cover case cc2, and the top case tc2 may be determined based on a base band. The base band may be located between the cover case cc2 and the top case tc2. A relative position relationship of the base band and the actuator case 2 will be described with reference to FIGS. 10 to 12.

An actuator ac2 is located on one surface of the base band, and includes a driver mb2 and an eccentric mass em2. The driver mb2 and the eccentric mass em2 may be rotatably connected through a shaft. The actuator ac2 may be an ERM. The actuator ac2 may generate a vibration when the eccentric mass em2 rotated by the driver mb2 serves as an imbalanced vibrator. The actuator ac2 may be a cylindrical vibration motor that has a diameter of about 6 mm and has a total height of about 17 mm. While a coin-shaped motor generates a vibration in a horizontal direction when a vibrator is rotated horizontally, the actuator ac2 of this embodiment may generate a vibration in a vertical direction.

The bottom case bc2 is located on the one surface of the base band, and includes a first accommodation part tha2 for accommodating the driver mb2 and a second accommodation part thb2 for accommodating the eccentric mass em2. That is, the bottom case bc2 may accommodate the whole or a portion of the actuator ac2 except a line. In some embodiments, when the bottom case bc2 accommodates only a portion of the actuator ac2, the other portion of the actuator ac2 may be accommodated by the cover case cc2 which will be described later.

The cover case cc2 is located on the one surface of the base band, and is coupled to the bottom case bc2 to allow the driver mb2 to be adhered closely to the first accommodation part tha2.

Referring to FIGS. 8 and 9, the cover case cc2 may be coupled to the bottom case bc2 while covering the actuator ac2. A male fastening part cm2 of the cover case cc2 is fitted into a female fastening part bsf2 of the bottom case bc2, so that the cover case cc2 can be firmly fixed to the bottom case bc2. In particular, the first accommodation part tha2 and an accommodation part chat may be formed such that the driver mb2 of the actuator ac2 can be firmly fixed. The male fastening part cm2 of the cover case cc2 may protrude such that the cover case cc2 is parallel to the surface on which the cover case cc2 is in contact with the base band. In this embodiment, four pairs of the male fastening parts cm2 and the female fastening parts bsf2 are provided. However, in some embodiments, the number of the male fastening parts cm2 and the female fastening parts bsf2 may vary.

The cover case cc2 is coupled to the bottom case bc2, to form, along with the second accommodation part thb2, an extra rotating space of the eccentric mass em2 while allowing the eccentric mass em2 to be spaced apart from the one surface of the base band. That is, an accommodation part chb2 of the cover case cc2 is matched to the second accommodation part thb2, to form an extra rotating space that does not interfere with rotation of the eccentric mass em2. Also, the accommodation part chb2 of the cover case cc2 functions to allow the eccentric mass em2 to be spaced apart from the one surface of the base band. Thus, even when the base band is made of a flexible cloth or rubber material, the eccentric mass em2 can be reliably rotated without colliding with the base band.

The top case tc2 is located on the other surface of the base band, and allows the bottom case bc2 to be fixed to the base band.

A male fastening part tm2 of the top case tc2 penetrates the base band and is coupled to a female fastening part bf2, so that the actuator ac2 and the actuator case 2 can be fixed to the base band. The base band may include an opening having a shape through which the male fastening part tm2 can pass. In some embodiments, an area of the top case tc2 adhered closely to the other surface of the base band may correspond to that of the bottom case bc2 adhered closely to the one surface of the base band. Since a space in which the male fastening part tm2 can be located is relatively sufficient, four pairs of the male fastening parts tm2 and the female fastening parts bf2 are provided in this embodiment. Thus, although the actuator ac2 is more strongly vibrated, this can be endured. In accordance with this embodiment, the area of the top case tc2 corresponds to that of the bottom case bc2, a sufficient vibration force is propagated to a back of a user, which is relatively less sensitive, so that the user can more surely feel a vibration. Further, in this embodiment, a corner of one surface of the top case tc2 is formed round, so that more comfortable feeling can be provided to the user.

The bottom case bc2 may include a protrusion part bm2, and the top case tc2 may include a recessed part tf2. The protrusion part bm2 of the bottom case bc2 is fitted into the recessed part tf2 while pressurizing the base band, so that the actuator ac2 and the actuator case 2 can be more firmly fixed to the base band. In this embodiment, since the area of the top case tc2 is relatively sufficient, six pairs of the protrusion parts bm2 and the recessed parts tf2 are provided, so that a sufficient supporting force can be provided.

Figure 10:
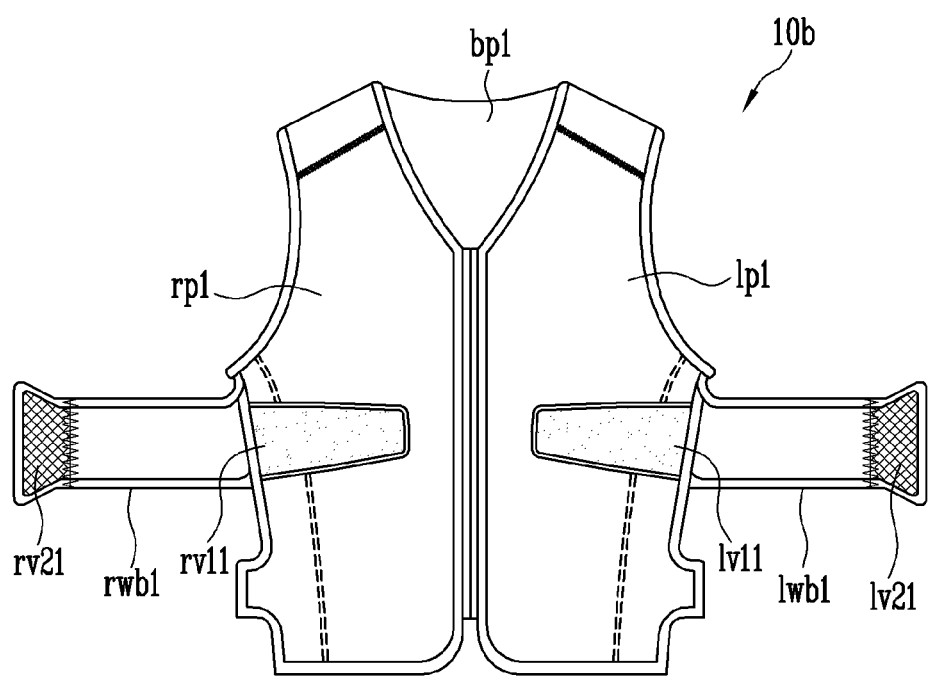
FIG. 10 is a front view of a tactile stimulation providing apparatus formed in the form of a vest in accordance with an embodiment of the present invention.
Figure 11:
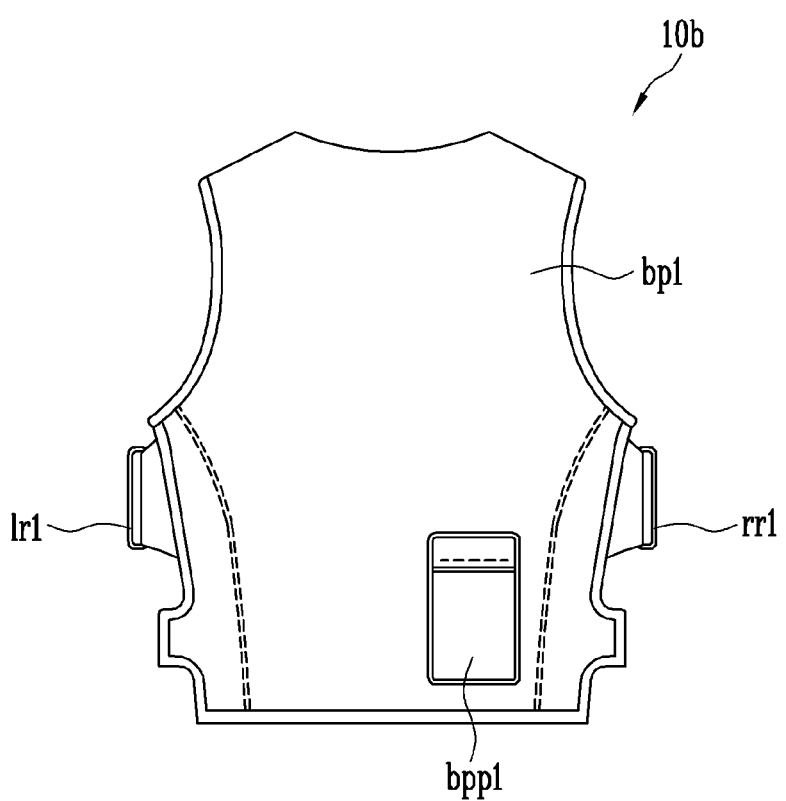
FIG. 11 is a rear view of the tactile stimulation providing apparatus shown in FIG. 10.
Figure 12:
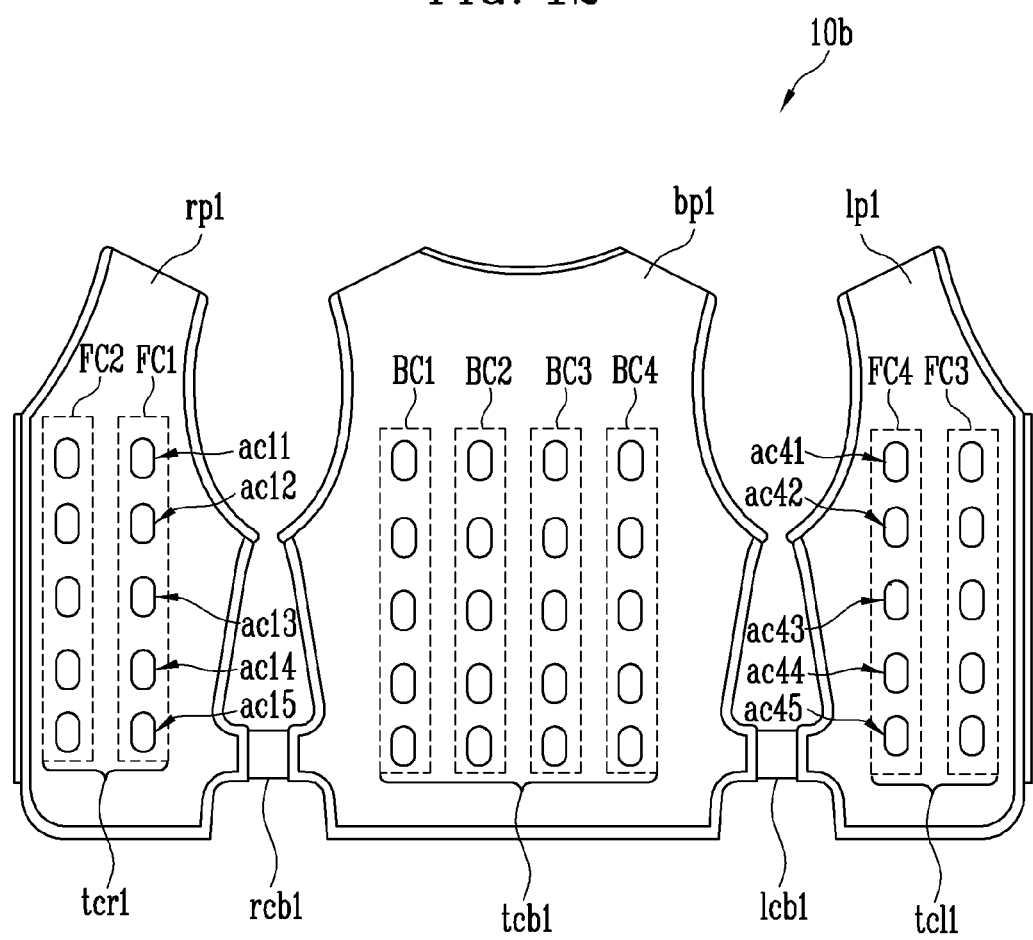
FIG. 12 is a view illustrating a case where front panels of the tactile stimulation providing apparatus shown in FIG. 11 are unfolded.

FIG. 10 is a front view of a tactile stimulation providing apparatus formed in the form of a vest in accordance with an embodiment of the present invention. FIG. 11 is a rear view of the tactile stimulation providing apparatus shown in FIG. 10. FIG. 12 is a view illustrating a case where front panels of the tactile stimulation providing apparatus shown in FIG. 11 are unfolded.

Referring to FIGS. 10 to 12, the tactile stimulation providing apparatus 10b may include a first front panel rp1, a second front panel lp1, and a rear panel bp1. Each of the panels rp1, lp1, and bp1 may be configured with a plurality of layers, and at least one layer among the plurality of layers may correspond to a base band. One surface of the base band may be located in the panel not to be seen. The other surface of the base band may be exposed to the inside with reference to FIG. 12.

The first front panel rp1 may include a plurality of actuators arranged between one side and the other side thereof. The second front panel lp1 may include a plurality of actuators arranged between one side and the other side thereof. The one side of the second front panel lp1 may be fastened to the other side of the first front panel rp1. For example, the one side of the second front panel lp1 and the other side of the first front panel rp1 may be fastened to each other through a zipper, Velcro, a buckle, a button, or the like.

The rear panel bp1 may include a plurality of actuators arranged between one side and the other side thereof. The one side of the rear panel bp1 may be fastened to the one side of the first front panel rp1, and the other side of the rear panel bp1 may be fastened to the other side of the second front panel lp1.

The rear panel bp1 may include a first ring rr1 connected to the one side thereof and a second ring lr1 connected to the other side thereof. The first front panel rp1 may include a first wing band rwb1 connected to the one side thereof. The second front panel lp1 may include a second wing band lwb1 connected to the other side thereof.

A detachable member rv21 may be located at one end of a front surface of the first wing band rwb1. A detachable member rv11 may be located on a front surface of the first front panel rp1, and be detachable from the detachable member rv21.

A detachable member lv21 may be located at one end of a front surface of the second wing band lwb1. A detachable member lv11 may be located on a front surface of the second front panel lp1, and be detachable from the detachable member lv21.

A user allows one end of the first wing band rwb1 to pass through the first ring rr1 and then pulls the first wing band rwb1 to fit a body size of the user, and attaches the detachable member rv21 to the detachable member rv11, so that the first front panel rp1 can be adhered closely to a torso of the user. Similarly, the user allows one end of the second wing band lwb1 to pass through the second ring lr1 and then pulls the second wing band lwb1 to fit the body size of the user, and attaches the detachable member lv21 to the detachable member lv11, so that the second front panel lp1 can be adhered closely to the torso of the user.

In accordance with an embodiment, a width of the one end of the first wing band rwb1 may be greater than that of the inner circumference of the first ring rr1, and a width of the one end of the second wing band lwb1 may be greater than that of the inner circumference of the second ring lr1. For example, the one end of the first wing band rwb1 and the one end of the second wing band lwb1 may have a trumpet shape or hook shape. Thus, when a user removes the tactile stimulation providing apparatus 21 from a torso of the user, the one ends of the wing bands rwb1 and lwb1 maintain a state in which they are caught by the respective rings rr1 and lr1, so that a process in which a next user again inserts the wing bands rwb1 and lwb1 into the respective rings rr1 and lr1 when the next user wears the tactile stimulation providing apparatus 21 can be omitted.

The rear panel bp1 may further include a pocket bpp1 for keeping a battery or other usages. An opening may be formed at a portion of the pocket bpp1 such that an electric wire of a battery can extend to the inside of the panels lp1, rp1, and bp1. In another embodiment, a controller may use an internal battery. Therefore, the pocket bpp1 may be unnecessary.

Referring to FIG. 12, each of the first front panel rp1, the rear panel bp1, and the second front panel lp1 of the tactile stimulation providing apparatus 10b in accordance with the another embodiment of the present invention may include a plurality of actuators.

When the front panels rp1 and lp1 are unfolded as shown in FIG. 12, a plurality of top cases tcr1 of the first front panel rp1, a plurality of top cases tcb1 of the rear panel bp1, and a plurality of top cases tcl1 of the second front panel lp1 may be exposed.

The plurality of top cases tcr1, tcb1, and tcl1 may be adhered closely to a torso of a user, when the tactile stimulation providing apparatus 10b is tightened around the torso of the user by the wing bands lwb1 and rwb1, the detachable members rv11, rv21, lv11, and lv21, and the rings lr1 and rr1. Thus, the user can strongly feel vibrations of the plurality of actuators built in the plurality of top cases tcr1, tcb1, and tcl1 through the plurality of top cases tcr1, tcb1, and tcl1 adhered closely to the torso of the user.

In another embodiment, inside skins severing as linings of the panels rp1, bp1, and lp1 may cover the plurality of top cases tcr1, tcb1, and tcl1 such that the plurality of top cases tcr1, tcb1, and tcl1 are not exposed to the outside.

In some embodiments, the first front panel rp1 may be elastically connected to the rear panel bp1 through a connection band rcb1. The second front panel lp1 may be elastically connected to the rear panel bp1 through a connection band lcb1.

The first front panel rp1 may include actuators corresponding to the top cases tcr1. For example, a front actuator column FC1 may include actuators ac11, ac12, ac13, ac14, and ac15 arranged in a column direction at one side of the first front panel rp1. In addition, a front actuator column FC2 may include actuators arranged in the column direction at the other side of the first front panel rp1.

The second front panel lp1 may include actuators corresponding to the top cases tcl1. For example, a front actuator column FC3 may include actuators arranged in the column direction at one side of the second front panel lp1. In addition, a front actuator column FC4 may include actuators ac41, ac42, ac43, ac44, and ac45 arranged in the column direction at the other side of the second front panel lp1.

The rear panel bp1 may include actuators corresponding to the top cases tcb1. For example, a rear actuator column BC1 may include actuators arranged in the column direction at one side of the rear panel bp1. A rear actuator column BC4 may include actuators arranged in the column direction at the other side of the rear panel bp1. Rear actuator columns BC2 and BC3 may be located between the rear actuator columns BC1 and BC4.

When a user wears the tactile stimulation providing 10b, the front actuator column FC1 and the rear actuator column BC1 are located at a right side of the user, and the front actuator column FC4 and the rear actuator column BC4 are located at a left side of the user. In addition, when the user wears the tactile stimulation providing apparatus 10b, the front actuator columns FC2 and FC3 are located at a front center of the user, and the rear actuator columns BC2 and BC4 are located at a rear center of the user.

Figure 13:
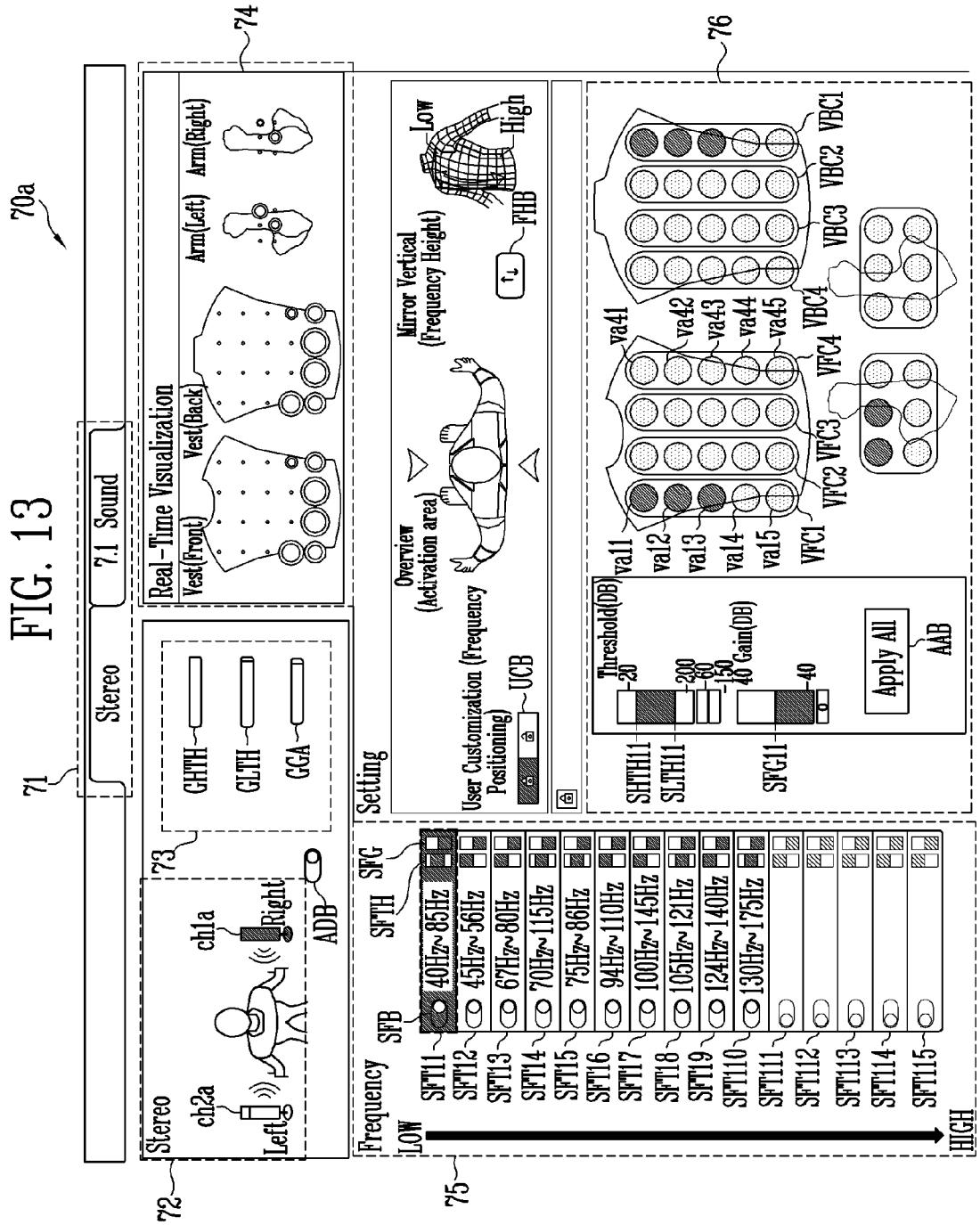
FIG. 13 is a view illustrating a user interface in accordance with an embodiment of the present invention.

FIG. 13 is a view illustrating a user interface in accordance with an embodiment of the present invention.

The user interface 70a may be generated by a program, and the program may be performed using a computer. The program may be recorded in a computer readable recording medium.

Referring to FIG. 13, the user interface 70a may include a mode selection area 71, a channel selection area 72, a global setting area 73, a simulation area 74, a channel setting area 75, and a local setting area 76. In some embodiments, some areas may be excluded from the user interface 70a.

In the mode selection area 71, one of a stereo audio mode having two audio channels and a surround audio mode having three or more audio channels may be selected. In FIG. 13, only a button corresponding to the stereo audio mode and a button corresponding to a 7.1 channel surround audio mode are illustrated. However, in another embodiment, a button corresponding to a 5.1 channel surround audio mode may be added. Hereinafter, a case the stereo audio mode is selected in the mode select area 71 is assumed.

The channel selection area 72 may be an area in which one of channels of the selected audio mode can be selected. For example, the stereo audio mode may include a first channel ch1a and a second channel ch2a. Hereinafter, for convenience of description, the first channel ch1a is assumed as a channel of a speaker located at a right side of a user, and the second channel ch2a is assumed as a change of a speaker located at a left side of the user.

The global setting area 73 may include global setting values commonly applied to frequency bands. For example, the global setting values may include a global highest threshold value GHTH, a global lowest threshold value GLTH, and a global gain value GGA. As the user adjusts the global highest threshold value GHTH, the global lowest threshold value GLTH, and the global gain value GGA, a highest threshold value, a lowest threshold value, and a gain value of all frequency bands (or selected frequency bands) can be simply adjusted.

The simulation area 74 may visualize driving strengths of virtual actuators, corresponding input audio data. For example, sizes of graphic symbols displayed on the virtual actuators may be changed according to magnitudes of the driving strengths. For example, when the driving strength is large, the graphic symbol may be displayed to become large. When the driving strength is small, the graphic symbol may be display to become small. Thus, the user can intuitively recognize corresponding magnitudes of vibration forces of real actuators according to the sizes of the graphic symbols with respect to the respective virtual actuators.

The channel setting area 75 may include frequency bands of at least one audio channel among two or more audio channels. For example, when the first channel ch1a is selected in the channel select area 72, frequency bands SFT11 to SFT115 of the first channel ch1a may be displayed. For example, a range of each of the frequency bands SFT11 to SFT115 may be a default value, and be a value set by the user. For example, the user may activate or inactivate each of the frequency bands by using a button SFB. Although not shown in the drawing, the channel setting area 75 may further include a button for determining whether the global setting values are to be applied to a corresponding frequency band.

In FIG. 13, only the frequency bands SFT11 to SFT115 are displayed in the channel setting area 75. In another embodiment, frequency bands of the first channel ch1a and second channel ch2a may all be displayed in the channel setting area 75. In this embodiment, the channel selection area 72 may be excluded from the user interface 70a.

The local setting area 76 may include local setting values of a selected frequency band among the frequency bands. The local setting values may include selected virtual actuators, corresponding to a selected frequency band among the plurality of virtual actuators. The local setting values may include a highest threshold value as an upper limit of valid data of the selected frequency band and a lowest threshold value as a lower limit of the valid data. Also, the local setting values may include a gain value as a scaling factor of the data of the selected frequency band.

For example, when the user selects a frequency band STF11 among the frequency bands SFT11 to SFT115, the user may set a highest threshold value SHTH11 and a lowest threshold value SLTH11 of the frequency band SFT11 in the local setting area 76. Also, the user may set a gain value SFG11 of the frequency band SFT11 in the local setting area 76.

When the user setting global setting values in the global setting area 73, the global setting values may be applied as reference values, and the local setting values may be applied as offset values. That is, a value obtained by adding up the global highest threshold value GHTH and the highest threshold value SHTH11 may be a final highest threshold value of the frequency band SFT11. Similarly, a value obtained by adding up the global lowest threshold value GLTH and the lowest threshold value SHTH11 may be a final lowest threshold value of the frequency band SFT11. Similarly, a value obtained by adding up the global gain value GGA and the gain value SFG11 may be a final gain value of the frequency band SFT11.

In another embodiment, when the user sets the highest threshold value SHTH11, the lowest threshold value SLTH11, and the gain value SFG11 of the frequency band SFT11 in the local setting area 76, the global setting values may be neglected. In this embodiment, final setting values with respect to the frequency band SFT11 may be the highest threshold value SHTH11, the lowest threshold value SLTH11, and the gain value SFG11, regardless of the global setting values.

Virtual actuators va11 to va45 corresponding to the actuators ac11 to ac45 shown in FIG. 12 may be displayed in the local setting area 76. Virtual actuator columns VFC1, VFC2, VFC3, and VFC4 may correspond to the front actuator columns FC1, FC2, FC3, and FC4 shown in FIG. 12. Similarly, virtual actuator columns VBC1, VBC2, VBC3, and VBC4 may correspond to the rear actuator columns BC1, BC2, BC3, and BC4 shown in FIG. 12.

The user may select virtual actuators va11 to va45 corresponding to the frequency band SFT11 in the local setting area 76. Actuators ac11, ac12, and ac13 corresponding to the selected virtual actuators va11, va12, and va13 may be driven with driving strengths corresponding to received actuator strength values.

Moreover, the user interface 70a may include various setting values for convenience of the user. For example, according to a state of a button AAB, it may be determined whether the local setting values of the selected frequency band are to be equally applied to other frequency bands. Accordingly, it is unnecessary for user to perform local setting on all the frequency bands one by one, and thus user convenience can be enhanced.

Figure 25:
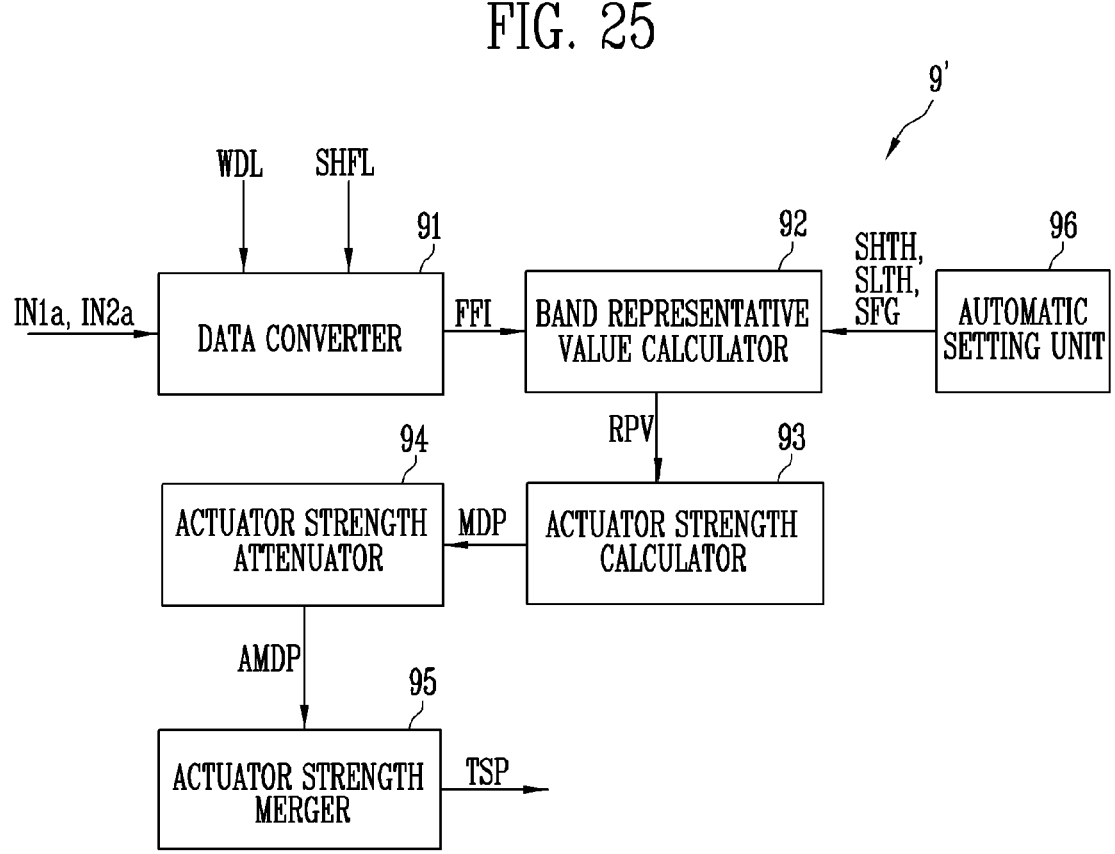
FIG. 25 is a view illustrating a tactile stimulation pattern generating apparatus in accordance with another embodiment of the present invention.

For example, according to a state of a button ADB, it may be determined whether an automatic setting unit 96 shown in FIG. 25 is to be operated. The automatic setting unit 96 will be described with reference to FIG. 25.

For example, when a button UCB is in a first state (lock state), the virtual actuators of the local setting area 76 may be in a selection impossible state. In this case, virtual actuators set as a default with respect to the selected frequency band may be fixedly selected. When the button UCB is in a second state (lock release state), the virtual actuators of the local setting area 76 may be in a selection possible state. In this case, as described above, the user may select the virtual actuators with respect to the selected frequency.

For example, a state of a button FHB may be dependent on the state of the button UCB. For example, when the button UCB is in the first state (lock state), the buffer FHB may be activated. When the activated button FHB is in the first state, an upper actuator row may be mapped as the frequency band becomes low, and a lower actuator row may be mapped as the frequency band becomes high. Meanwhile, when the activated button FHB is in the second state, an upper actuator row may be mapped as the frequency band becomes high, and a lower actuator row may be mapped as the frequency band becomes low. Accordingly, it is unnecessary for the user to perform actuator mapping on the frequency bands one by one, and thus the user convenience can be enhanced.

Although not shown in the drawing, a button for copying setting values of the first channel ch1$a$ as setting values of the second channel ch2$a$ may be added. Virtual actuator columns corresponding to the setting values of the first channel ch1$a$ may be different from virtual actuator columns corresponding to the copied setting values of the second channel ch2$a$. For example, when the first channel ch1$a$ corresponds to the speaker located at the right side of the user and the second channel ch2$a$ corresponds to the speaker located at the left side of the user, virtual actuator columns correspond to the setting values of the first channel ch1$a$ may be symmetrical (left-right reverse) to the virtual actuator columns corresponding to the copied setting values of the second channel ch2$a$. In another embodiment, such a button does not exist, and such a function may be included as a basic function of the user interface 70$a$.

In accordance with the above-described embodiment, although only setting values with respect to one channel are set, setting values with respect to another channel are set, so that the convenience of the user can be enhanced.

Figure 14:
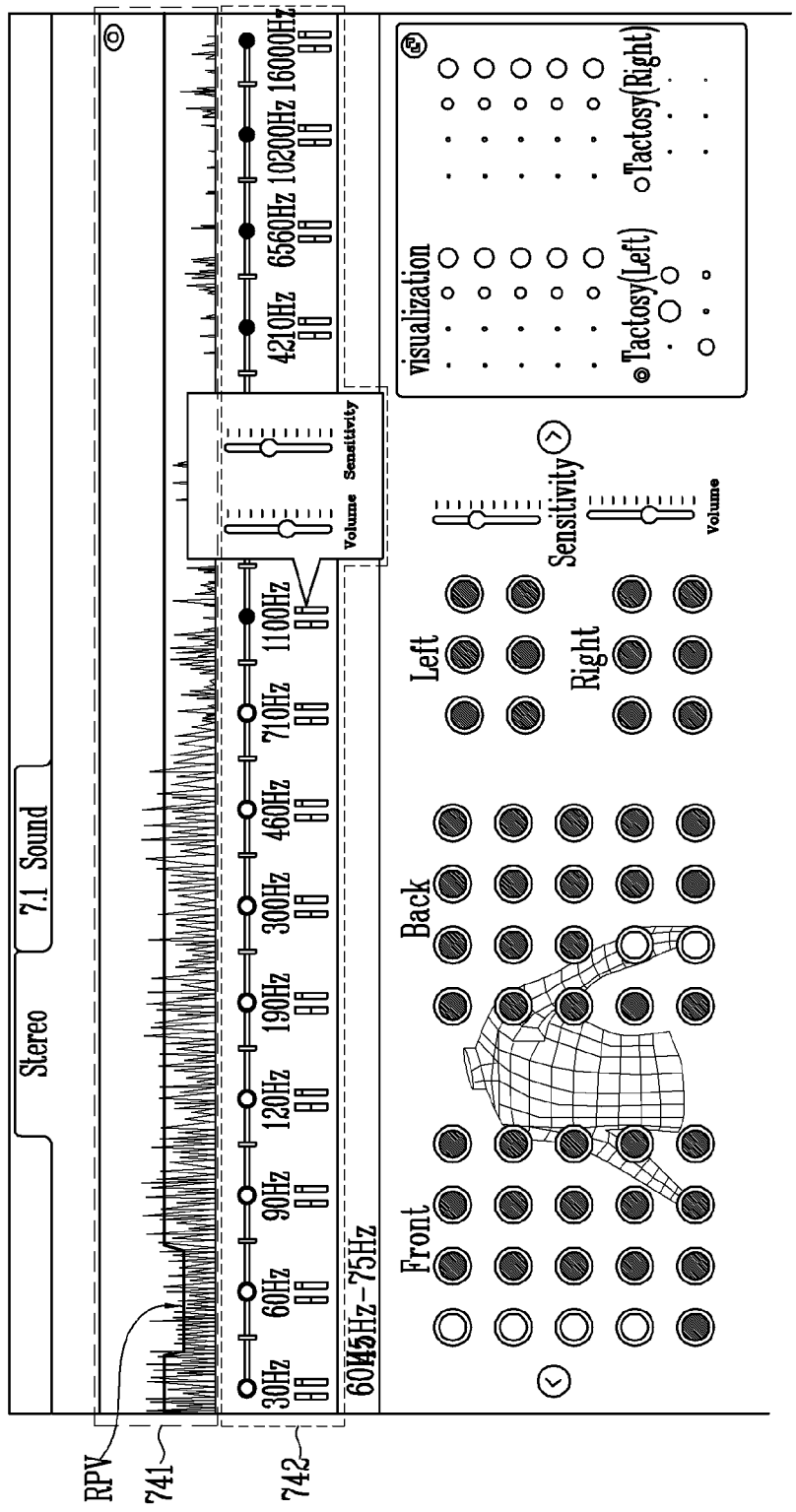
FIGS. 14 and 15 are views illustrating a simulation area of the user interface shown in FIG. 13.
Figure 15:
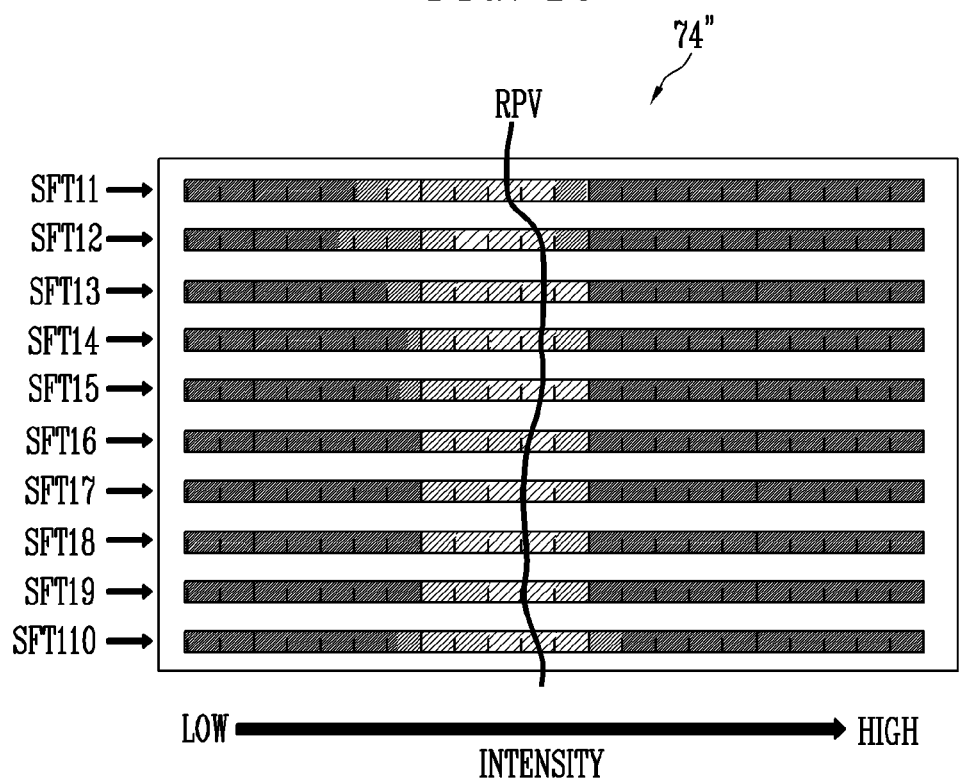

FIGS. 14 and 15 are views illustrating the simulation area of the user interface shown in FIG. 13.

Referring to FIG. 14, a simulation area 74' in accordance with another embodiment is illustrated.

The simulation area 74' may include an area 742 in which frequency bands of a selected channel are displayed and an area 741 in which a signal intensity with respect to each frequency is displayed. For example, the signal intensity with respect to each frequency may be represented as a PSD (power spectral density), a magnitude, a phase, or the like. In addition, representative values RPV with respect to the respective frequency bands may be displayed as a graph.

In accordance with this embodiment, the simulation area 74' may convert, in real time, each frame of audio data reproduced currently into a frequency domain and display the frequency domains as decibel values. By referring to such information, the user can easily set a gain value, a lowest threshold value, and a highest threshold value of each frequency band.

Referring to FIG. 15, a simulation area 74" in accordance with an embodiment is illustrated.

The simulation area 74" may visualize a frequency distribution of representative values according to a lapse of time, with respect to each of frequency bands SFT11 to SFT110. For example, a bright portion in each frequency band may mean that a large number of frames has corresponding representative values, and a dark portion in each frequency band may mean that a small number of frames has corresponding representative values.

Thus, the user refers to the simulation area 74", to easily set a gain value, a lowest threshold value, and a highest threshold value of each frequency band.

Figure 16:
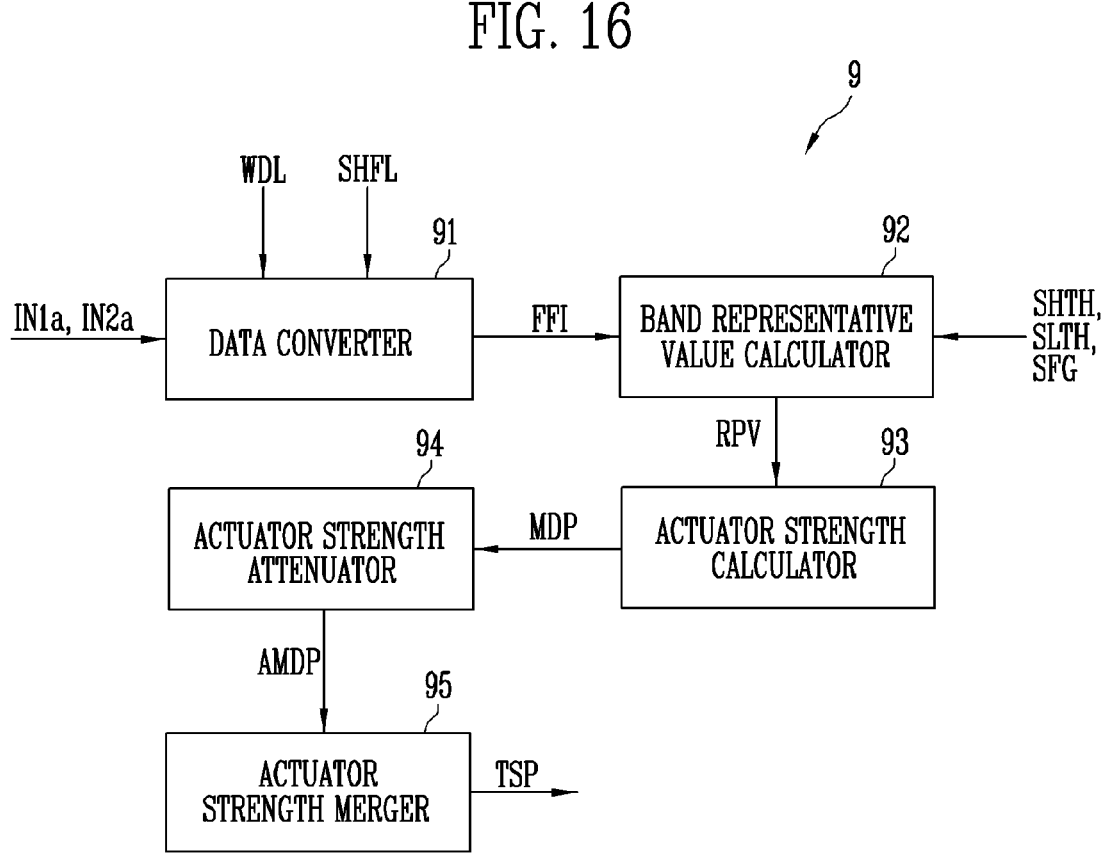
FIG. 16 is a view illustrating a tactile stimulation pattern generating apparatus in accordance with an embodiment of the present invention.
Figure 17:
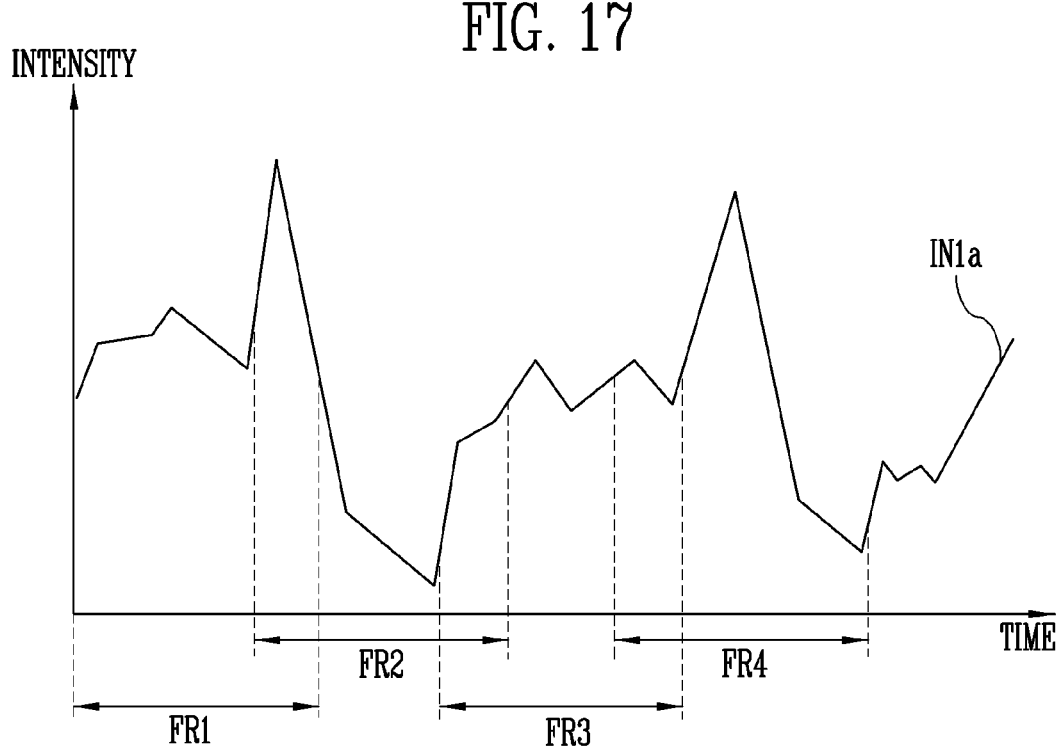
FIG. 17 is a view illustrating a data converter of the tactile stimulation pattern generating apparatus shown in FIG. 16.
Figure 18:
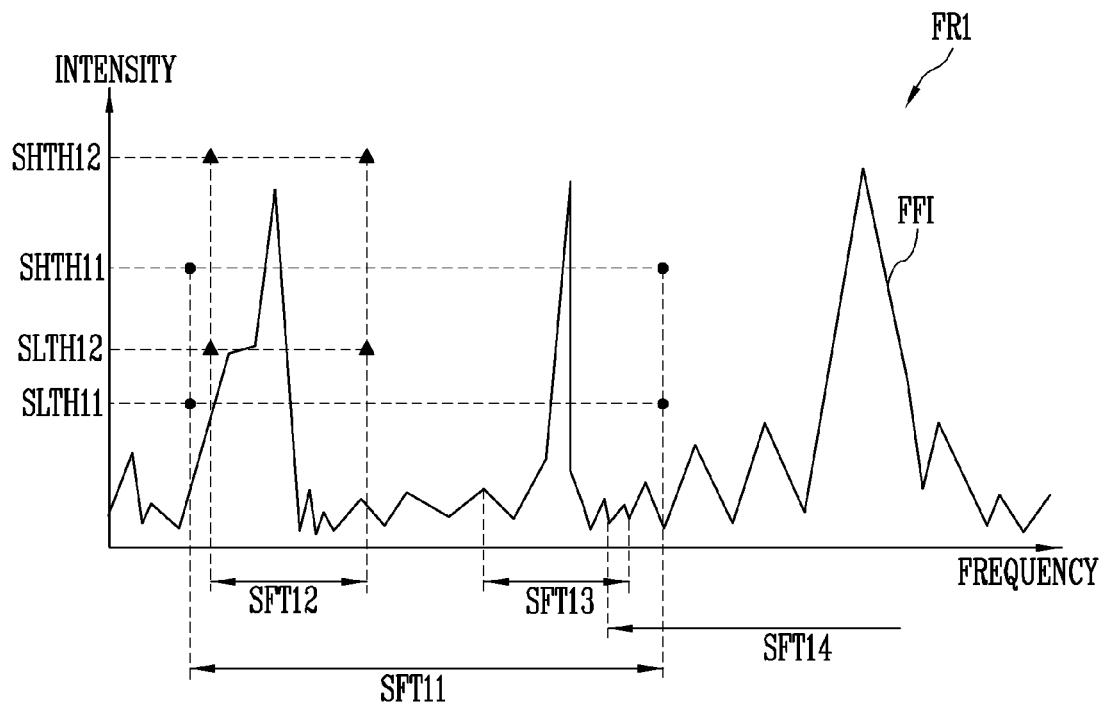
FIG. 18 is a view illustrating a band representative value calculator of the tactile stimulation pattern generating apparatus shown in FIG. 16.

FIG. 16 is a view illustrating a tactile stimulation pattern generating apparatus in accordance with an embodiment of the present invention. FIG. 17 is a view illustrating a data converter of the tactile stimulation pattern generating apparatus shown in FIG. 16. FIG. 18 is a view illustrating a band representative value calculator of the tactile stimulation pattern generating apparatus shown in FIG. 16. FIGS. 19 to 22 are views illustrating an actuator strength calculator of the tactile stimulation pattern generating apparatus shown in FIG. 16. FIG. 23 is a view illustrating an actuator strength merger of the tactile stimulation pattern generating apparatus shown in FIG. 16.

Referring to FIG. 16, the tactile stimulation pattern generating apparatus 9 in accordance with the embodiment of the present invention may include a data converter 91, a band representative value calculator 92, an actuator strength calculator 93, an actuator strength attenuator 94, and an actuator strength merger 95.

The data converter 91 may convert first audio data IN1$a$ and second audio data IN2$a$ of a time domain respectively into first converted data and second converted data of a frequency domain.

In an embodiment, the first audio data IN1$a$ and the second audio data IN2$a$ may be audio data directly received by the tactile stimulation pattern generating apparatus 8. Alternatively, the first audio data IN1$a$ and the second audio data IN2$a$ may be audio data stored in a recording medium.

In another embodiment, the first audio data IN1$a$ and the second audio data IN2$a$ may be data obtained as the tactile stimulation pattern generating apparatus 9 intercepts audio data transmitted from a first program (e.g., a game program) to an audio device (e.g., a speaker, a headset, or the like). The first program may be a program of a computer, and the tactile stimulation pattern generating apparatus 9 may be implemented with a second program of the corresponding computer. For example, the tactile stimulation pattern generating apparatus 9 may intercept a system call generated from an operating system of the computer, to generate the first audio data IN1$a$ and the second audio data IN2$a$.

Although a stereo audio mode having two channels is assumed in this embodiment, three or more data may be provided in another embodiment with respect to a surround audio mode having three or more channels. In addition, hereinafter, only first converted data FFI corresponding to the first audio data IN1$a$ will be described. The same description may be applied even to second converted data corresponding to the second audio data IN2$a$, and therefore, overlapping descriptions will be omitted.

Referring to FIGS. 16 and 17, the data converter 91 may sample a plurality of frames FR1, FR2, FR3, and FR4 from the first audio data IN1$a$, based on a window length WDL and a shift length SHFL.

The window length WDL is a setting value for determining a length with respect to a time axis of the frames FR1, FR2, FR3, and FR4 in the first audio data IN1$a$. As the window length WDL becomes longer, each of the frames FR1 to FR4 may detect and include a lower frequency component, and have a higher frequency resolution. However, since a data amount and a sampling time increase as the window length WDL becomes longer, it is necessary to appropriately set the window length WDL. In addition, when the window length WDL is set excessively long, a change in audio data may not be appropriately reflected to a representative value RPV. For example, when the window length WDL is 500 ms, and a signal intensity is increased due to a sound effect such as a gunshot at a last portion (e.g., 450 ms to 500 ms) of the corresponding window, this is a change occurring in 10% of the entire window even when a signal considerably increases.

For example, the window length WDL may be set relatively long at a portion at which a time signature, a tempo, a beat, and the like are important, such as a song or a musical program. Also, the window length WDL may be set relatively short at a portion at which a sound effect is important, such as a gunshot or an explosive sound. The window length WDL may be automatically set by analyzing audio data, or be directly set by a user. In some embodiments, the window length WDL may vary according to time even in one audio data.

The shift length SHFL is a setting value for setting a position on a time axis of a next frame with reference to a position on a time axis of a current frame. That is, the shift length SHFL is a setting value with respect to a time interval between the current frame and the next frame. An overlapping degree of the current frame and the next frame may be determined according to the window length WDL and the shift length SHFL. When the shift length SHFL is excessively long, the user may feel latency, and therefore, an appropriate setting value is required.

Although not shown in the drawings, the data converter 91 may include a sampling frequency as a setting value. In the case of digital data audio, a predetermined sampling frequency exists in a system and a file, and therefore, the data converter 91 may use this sampling frequency. However, when analog audio data such as an audio book is received, it is necessary for the data converter 91 to receive a sampling frequency having an appropriate value. Similar to the window length WDL, the sampling frequency may be determined according an amount of processable data, a speed according thereto, and a characteristic of an audio signal (fast at a high sampling frequency in the case of an important sound such as a fine melody, specifically, a low frequency in the case where a short sound spread in a wide band such as gunfire).

In accordance with an embodiment, the data converter 91 may apply a corrected window to a sampled frame FR1. Windows known in the conventional art, which are used for FFT (Fast Fourier Transform), such as Hann, hamming, and Blackmann-harris windows, may be used as the corrected window. Since the data converter 91 applies the corrected window to the sampled frame FR1, leakage of an FFT spectrum according to discontinuity of start data and end data of a frame can be prevented, and intensity information on a more accurate frequency can be acquired.

The data converter 91 converts the frame FR1 to which the corrected window is applied into a frequency domain, so that the first converted data FFI can be generated. Various existing algorithms such as the above-described FFT may be used to convert the frame FR1 into the frequency domain.

The band representative value calculator 92 may calculate representative values RPV of the frequency bands SFT11 to SFT110 with respect to each of the first converted data FFI and the second converted data. The band representative value calculator 92 may further receive a lowest threshold value SLTH, a highest threshold value SHTH, and a gain value SFG. The representative values RPV may be based on valid data which are greater than a lowest threshold value SLTH of each of the frequency bands SFT11 to SFT110 and are smaller than a highest threshold value SHTH of each of the frequency bands SFT11 to SFT110.

Referring to FIG. 18, at least two of frequency bands SFT11, SFT12, SFT13, and SFT14 may overlap with each other in at least a partial range. For example, a frequency band SFT11 and a frequency band SFT12 may overlap with each other, and the frequency band SFT11 and a frequency band SFT13 may overlap with each other. To this end, sounds in a relatively narrow frequency range, such as a voice, may be emphasized while effectively covering sounds in relatively wide frequency range, such as a drum beat and a base sound (sound characteristic emphasis effect).

According to such a configuration, a representative value of the frequency band SFT11 covering a wide frequency range may be converted into a relatively large number of actuator strength values, and the frequency bands SFT12 and SFT13 covering a narrow frequency range may be converted into a relatively small number of actuator strength values or one actuator strength value. Accordingly, the user feels as if the user is in front of a larger speaker. Thus, the user feels a stronger sensation of immersion.

In accordance with an embodiment, a first lowest threshold value SLTH11 corresponding to the first frequency band SFT11 among the frequency bands SFT11 to SFT14 may be different from a second lowest threshold value SLTH12 corresponding to the second frequency band SFT12 among the frequency bands SFT11 to SFT14. In addition, a first highest threshold value SHTH11 corresponding to the first frequency band SFT11 may be different from a second highest threshold value SHTH12 corresponding to the second frequency band SFT12. In accordance with an embodiment, a first gain value SFG11 corresponding to the first frequency band SFT11 among the frequency bands SFT11 to SFT14 may be different from a second gain value corresponding to the second frequency band SFT12 among the frequency bands SFT11 to SFT14.

In another embodiment, the lowest threshold value SLTH, the highest threshold value SHTH, and the gain value SFG may be commonly set with respect to the frequency bands SFT11 to SFT14 (see the global setting area 73 shown in FIG. 13).

First, the band representative value calculator 92 may apply the first gain value SFG11 to data (intensity values) of the first frequency band SFT11. For example, when the data and the first gain value SFG11 are values of a linear scale, each of the data may be multiplied by the first gain value SFG11. For example, when the data and the first gain value SFG11 are values of a logarithmic scale, the first gain value SFG11 may be added up to each of the data. For convenience of descriptions, a case where gain values of each of the frequency bands SFT11 to SFT14 are 0 is assumed in FIG. 18 (logarithmic scale). Similarly, the band representative value calculator 92 may apply the second gain value to data (intensity values) of the second frequency band SFT12.

Next, the band representative value calculator 92 may determine, as valid data of the first frequency band SFT11, data which are greater than the first lowest threshold value SLTH11 and are smaller than the first highest threshold value SHTH11 among data (intensity values) of the first frequency band SFT11. Similarly, the band representative value calculator 92 may determine, as valid data of the second frequency band SFT12, data which are greater than the second lowest threshold value SLTH12 and are smaller than the second highest threshold value SHTH12 among data (intensity values) of the second frequency band SFT11.

Finally, the band representative value calculator 92 may determine a representative value RPV of the first frequency band SFT11, based on the valid data of the first frequency band SFT11. Similarly, the band representative value calculator 92 may determine a representative value of the second frequency band SFT12, based on the valid data of the second frequency band SFT12.

Each of the representative values RPV may be set as an average value of valid data of each frequency band, an RMS (root mean square) of the valid data, a sum of the valid data, or the like. The valid data may be at least one of a PSD value, a magnitude value, and a phase value.

The actuator strength calculator 93 may calculate actuator strength values MDP corresponding to the representative values RVP. Referring to FIGS. 19 to 22, various embodiments of a mapping curve CCV of the actuator strength value MDP with respect to the representative value RPV are illustrated.

In accordance with an embodiment, an appropriate tactile stimulation may be provided by increasing the actuator intensity value MDP as the representative value RPV becomes larger (as a sound becomes louder). However, when sizes of valid data further increase in a state in which the representative is close to an upper limit, the representative value RPV output by the band representative value calculator 92 may become 0. There is a problem in that a strong tactile stimulation is provided and then the provision of the tactile stimulation is suddenly suspended. In this case, the strong tactile stimulation is intermittently provided, and therefore, the user may feel inconvenience.

Figure 19:
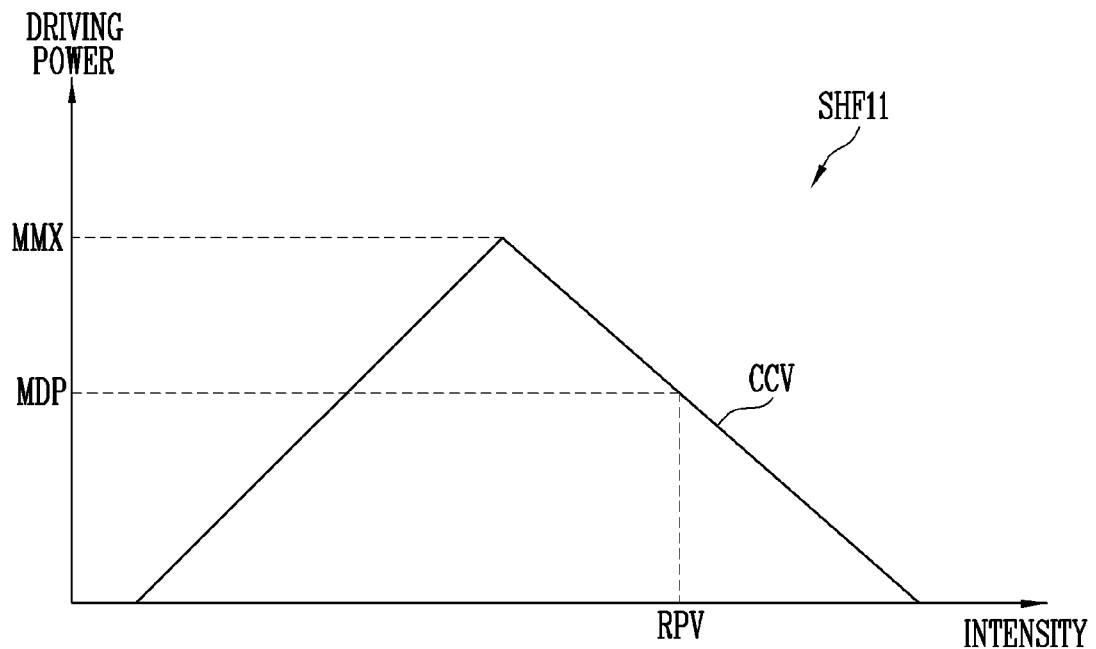
FIGS. 19 to 22 are views illustrating an actuator strength calculator of the tactile stimulation pattern generating apparatus shown in FIG. 16.

Referring to FIG. 19, the actuator strength calculator 93 may calculate actuator strength values MDP to become smaller as representative values RPV become smaller, and calculate the actuator strength values MDP to become smaller as the representative values RPV become larger. In an embodiment, at least one representative value RPV may correspond to a maximum value MMX of the actuator strength values MDP.

Figure 20:
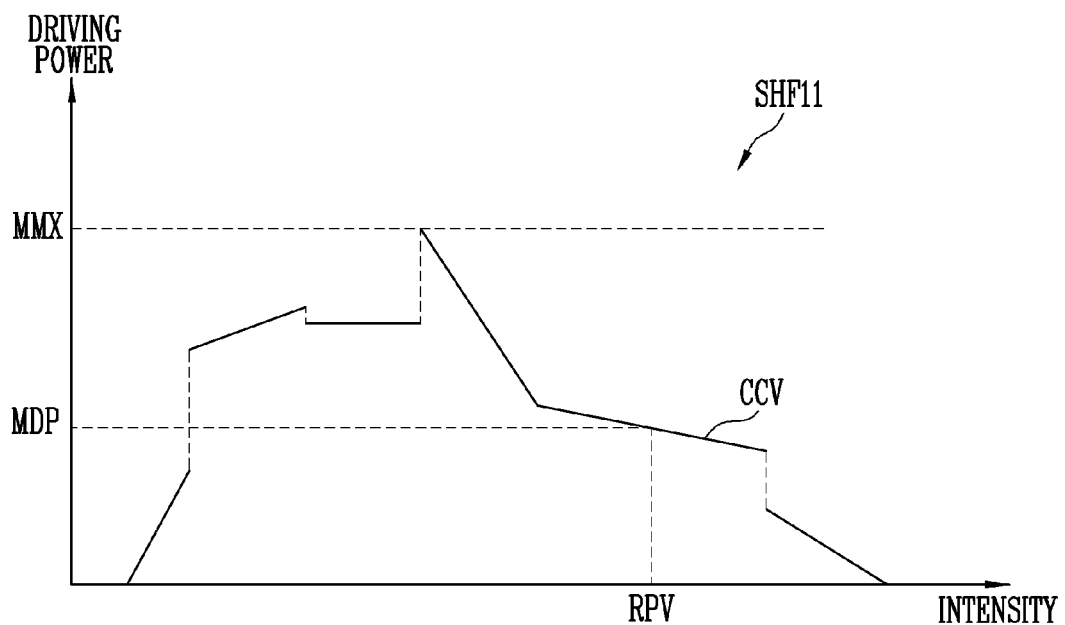

Referring to FIG. 20, a relationship of the representative values RPV and the actuator strength values MDP may include a discontinuous function. For example, a mapping curve CCV may be non-linear. For example, the mapping curve CCV may be set through a classification algorithm using machine learning.

Figure 21:
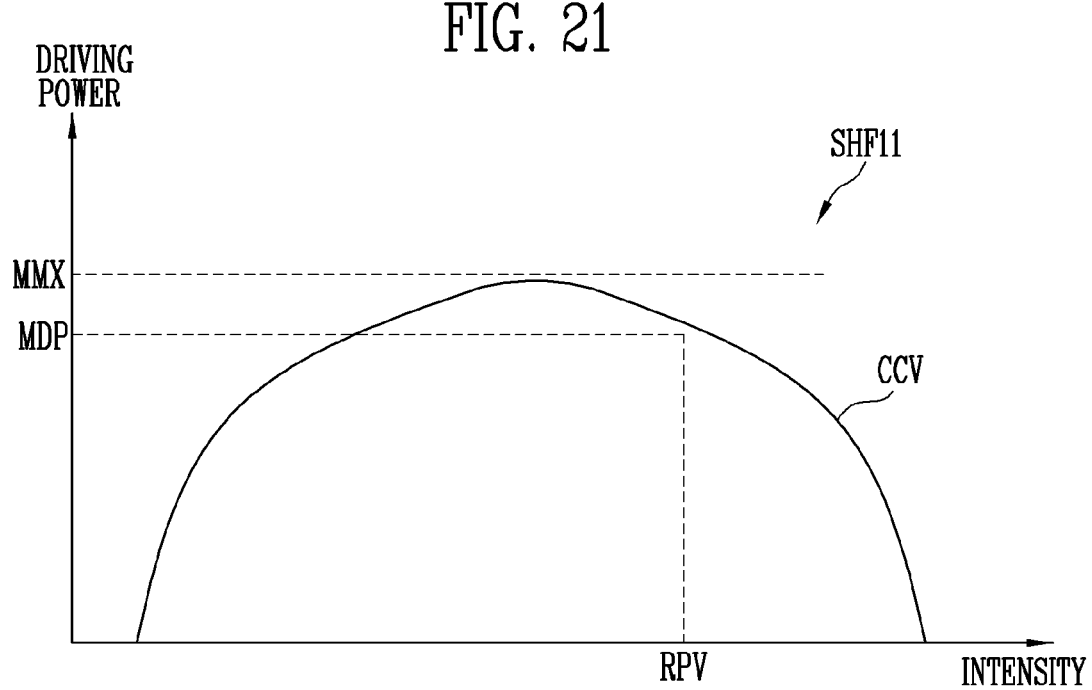

Referring to FIG. 21, it can be seen that a mapping curve CCV may be set to have a curved form. For example, the mapping curve CCV may include logarithmic functions symmetrical to each other with respect to a representative value RPV corresponding to the maximum value MMX.

Figure 22:
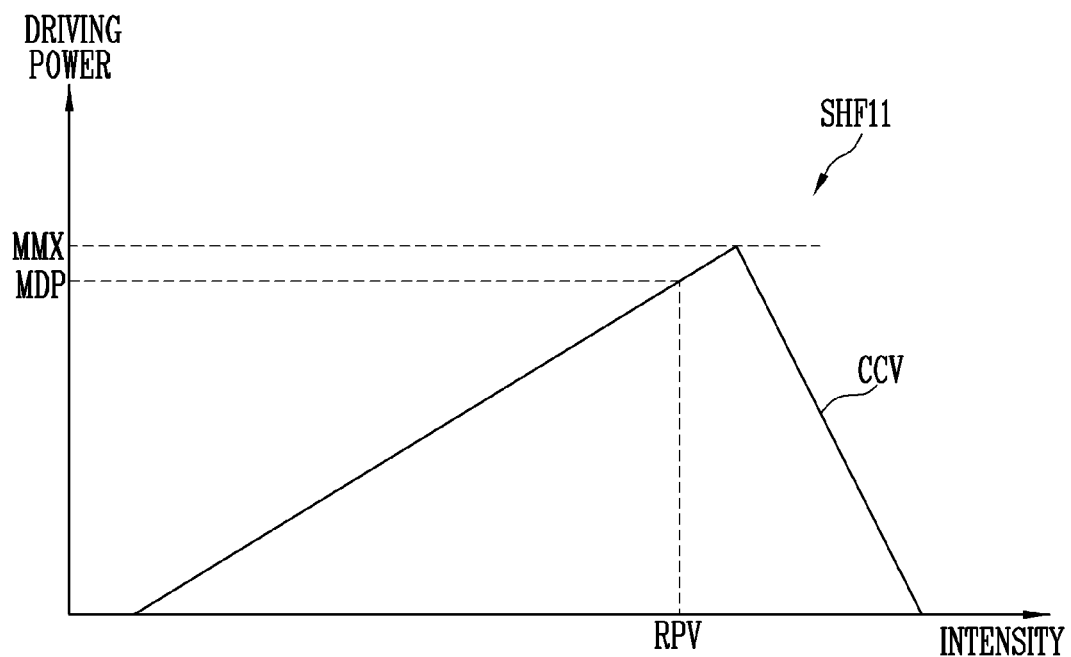
Figure 23:
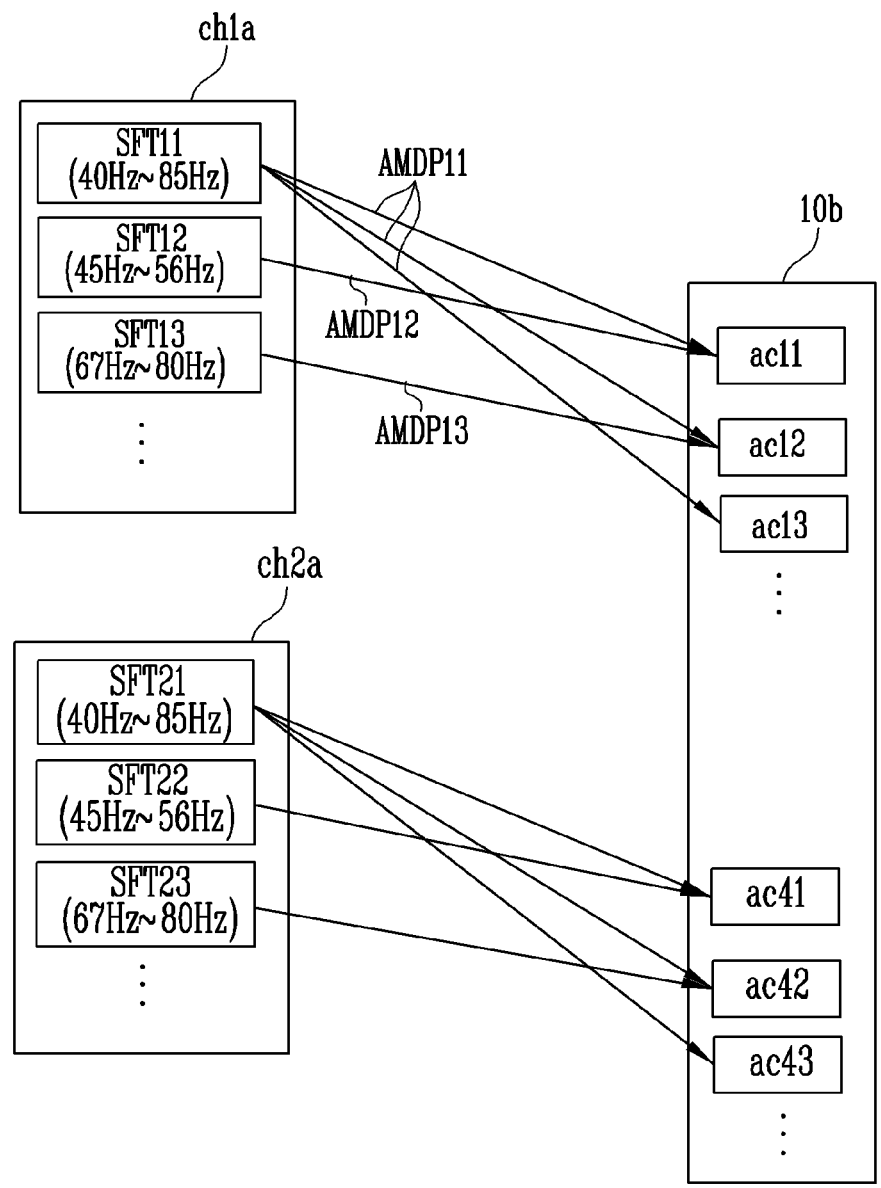
FIG. 23 is a view illustrating an actuator strength merger of the tactile stimulation pattern generating apparatus shown in FIG. 16.

Referring to FIG. 22, a mapping curve CCV may be set such that a representative value RPV corresponding to the maximum value MMX is closer to the highest threshold value SHTH than the lowest threshold value SLTH. In accordance with this embodiment, the actuator strength value MDP may be naturally increased as the representative value RPV becomes larger (as a sound becomes louder). In addition, when the representative value RPV is continuously provided in the vicinity of the highest threshold value SHTH, a strong tactile stimulation can be prevented from being intermittently provided.

The actuator strength attenuator 94 may gradually attenuate actuator strength values MDP when the actuator strength values MDP are maintained for a certain time or more, thereby providing attenuated actuator strength values AMDP.

Users may feel displeasure when the same vibration is continued. In addition, a tactile sensation of a human has a characteristic that reaction becomes small with respect to the same stimulation provided continuously. Therefore, when the actuator strength values MDP are maintained for a certain time or more, an option of gradually attenuating the actuator strength values MDP may be provided to the user.

The actuator strength attenuator 94 may exponentially decrease the actuator strength values MDP (see Equation 1).

$$y'(t)=y'(t-1)*e^{\wedge}(-0.6931/tau*f*dt)+a*(y(t)-y(t-1))$$ [Equation 1]

Here, y(t) may an actuator strength value MDP at a current time, y(t−1) may be an actuator strength value MDP at a previous time, y'(t) may be an attenuated actuator strength value AMDP at the current time, y'(t−1) may be an attenuated actuator strength value AMDP at the previous time, a may be a weighted value with respect to a change value, f may be a frequency median value in a corresponding frequency band, tau may be an attenuation parameter, and dt may be a sampling interval (e.g., a shift length SHFL).

In a sine wave having an f frequency, after a time for which a tau cycle elapses, the actuator strength value MDP may become a half. According to Equation 1, y'(t) may be smaller than y(t) in most situations according to a setting value of a, and hence it is necessary to periodically reset y'(t) to y(t). For example, when an absolute value of a variation (y(t)−y(t−1)) of the actuator strength value MDP is greater than a specific value, it is necessary to reset y'(t) to y(t).

In the above-described embodiment, the actuator strength attenuator 94 attenuates the actuator strength values MDP. However, in another embodiment, the actuator strength attenuator 94 may attenuate the representative values RPV. For example, the actuator strength attenuator 94 may gradually attenuate the representative values RPV when the representative values RPV are maintained for a certain time or more.

The actuator strength merger 94 may merge two or more actuator strength values mapped to one actuator, thereby generating one actuator strength value.

Referring to FIG. 23, for example, actuator strength values AMDP11 of the frequency band SFT11 may be mapped to actuators ac11, ac12, and ac13, an actuator strength value AMDP12 of the frequency band SFT12 may be mapped to an actuator ac11, and an actuator strength value AMDP13 of the frequency band SFT13 may be mapped to an actuator ac12.

The actuator ac11 may be driven with respect to only one actuator strength value, and therefore, it is necessary to merge the actuator strength value AMDP11 and the actuator strength value AMDP12 (see FIGS. 12 and 13).

In accordance with an embodiment, an average value of the actuator strength value AMDP11 and the actuator strength value AMDP12 may be provided as a merged actuator strength value to the actuator ac11. In accordance with another embodiment, the actuator strength value AMDP11 and the actuator strength value AMDP12 may be multiplied by different weighted values, and a value obtained by adding up the multiplied values may be provided as a merged actuator strength value to the actuator ac11. In accordance with still another embodiment, a largest value of the actuator strength value AMDP11 and the actuator strength value AMDP12 may be provided as a merged actuator strength value to the actuator ac11.

When the actuator strength values AMDP are values of a logarithmic scale such as a decibel, the actuator strength values AMDP may be first converted with a linear scale through an exponential function. After the actuator strength values AMDP of the linear scale are merged, a merged actuator strength value may be again converted with the linear scale and then provided to an actuator. Through such a process, the user may naturally feel the merged actuator strength value.

Figure 24:
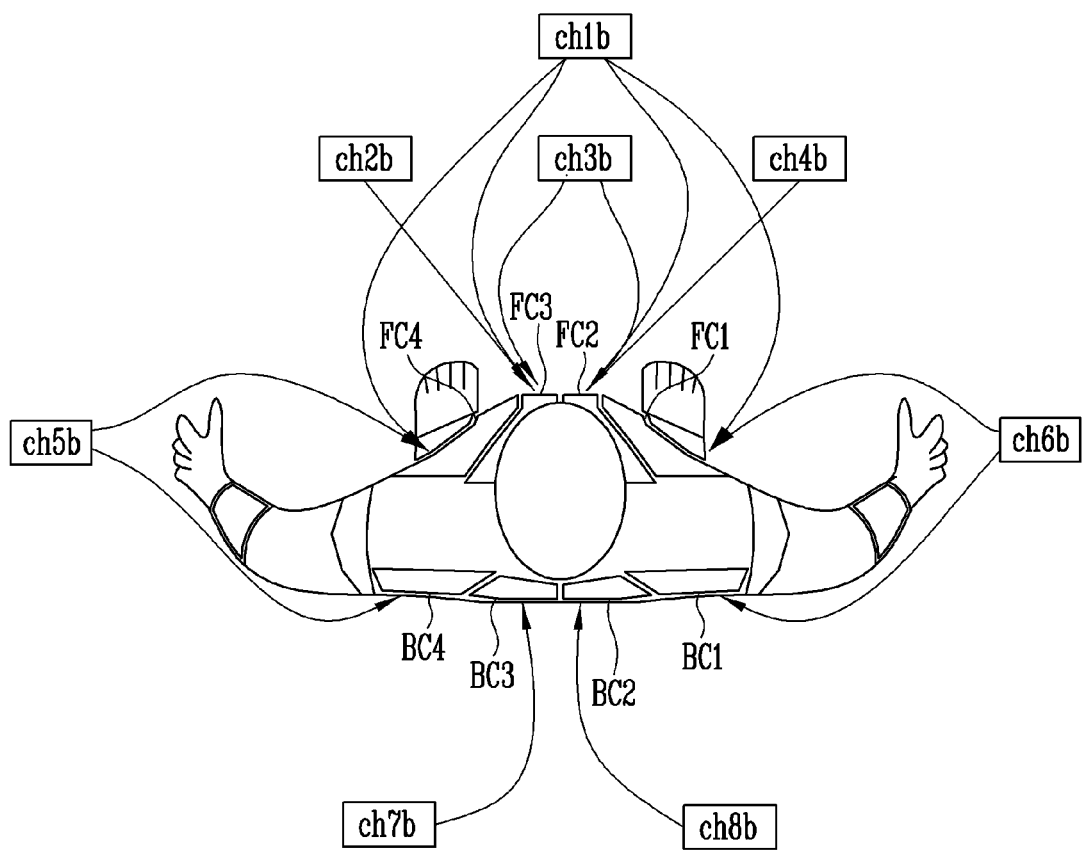
FIG. 24 is a view illustrating an exemplary relationship between the tactile stimulation pattern generating apparatus and the tactile stimulation providing apparatus.

FIG. 24 is a view illustrating an exemplary relationship between the tactile stimulation pattern generating apparatus and the tactile stimulation providing apparatus.

Referring to FIG. 24, how eight channels ch1b to ch8b are mapped to actuator columns FC1 to FC4 and BC1 to BC4 when an audio mode includes the eight channels ch1b to ch8b, such as a 7.1 surround audio mode is exemplarily illustrated.

For example, the tactile stimulation providing apparatus 10b may provide position information corresponding to each actuator. The position information may be information on which part of the tactile stimulation providing apparatus 10b each actuator is located. For example, the tactile stimulation pattern generating apparatus 9 may provide position information corresponding to each virtual actuator. In some embodiments, at least one of the tactile stimulation providing apparatus 10b and the tactile stimulation pattern generating apparatus 9 may provide the above-described position information.

For example, audio data of the channels ch1b to ch8b may include direction information on a corresponding channel.

In accordance with an embodiment, first audio data with respect to a channel ch6b may include information on a first direction (right direction), and second audio data with respect to a channel ch5b may include information on a second direction (left direction) different from the first direction.

An actuator (one of actuators of the front actuator column FC1 and the rear actuator column BC1) corresponding first position information corresponding to the first direction may be driven based on only at least one of first actuator strength values of the first audio data (not based on the second audio data). In addition, an actuator (one of actuators of the front actuator column FC4 and the rear actuator column BC4) corresponding to second position information corresponding to the second direction may be driven based on only at least one of second actuator strength values of the second audio data (not based on the first audio data).

Similarly, an actuator column (one of the front actuator column FC1 and the rear actuator column BC1) corresponding to the first position information corresponding to the first direction may be driven based on only at least one of the first actuator strength values of the first audio data. In addition, an actuator column (one of the front actuator column FC4 and the rear actuator column BC4) corresponding to the second position information corresponding to the second direction may be driven based on only at least one of the second actuator strength values of the second audio data.

For example, a channel ch1b corresponding to a subwoofer may be mapped to the front actuator columns FC1, FC2, FC3, and FC4. A channel ch2b corresponding to a front left direction may be mapped to the front actuator column FC3. A channel ch3b corresponding to a front center direction may be mapped to the front actuator columns FC2 and FC3. A channel ch4b corresponding to a front right direction may be mapped to the front actuator column FC1.

In addition, the channel ch5b corresponding to the left direction may be mapped to the front actuator column FC4 and the rear actuator column BC4. The channel ch6b corresponding to the right direction may be mapped to the front actuator column FC1 and the rear actuator column BC1. A channel ch7b corresponding to a rear left direction may be mapped to the rear actuator column BC3. A channel ch8b corresponding to a rear right direction may be mapped to the rear actuator column BC2.

The above-described directions are based on a user wearing the tactile stimulation providing apparatus 10. In accordance with the above-described embodiment, the directionality of a sound can be emphasized according to positions of actuators. In particular, although a 7.1 surround audio system is provided in a specific space, the 7.1 surround audio system at a fixed position does not provide the directionality of a proper sound when the user moves or changes a user's direction. In accordance with this embodiment, the directionality of a sound is emphasized through the tactile stimulation providing apparatus 10 which the user directly wears, and thus the directionality of a sound does not go wrong even when the user moves or changes a user's direction.

FIG. 25 is a view illustrating a tactile stimulation pattern generating apparatus in accordance with another embodiment of the present invention.

The tactile stimulation pattern generating apparatus 9' shown in FIG. 25 is different from the tactile stimulation pattern generating apparatus 9 shown in FIG. 16, in that the tactile stimulation pattern generating apparatus 9' further includes an automatic setting unit 96. A band representative value calculator 92 of the tactile stimulation pattern generating apparatus 9' is different from the band representative value calculator 92 of the tactile stimulation pattern generating apparatus 9, in that the band representative value calculator 92 uses a highest threshold value SHTH, a lowest threshold value SLTH, and a gain value SFG, which the automatic setting unit 96 provides.

For example, the automatic setting unit 96 may calculate a valid range of representative values RPV, based on a frequency distribution of the representative values RPV according to a lapse of time, with respect to each frequency band, set a lowest threshold value SLTH to correspond to a minimum value of the valid range, and set a highest threshold value SHTH to correspond to a maximum value of the valid range (see the histogram shown in FIG. 15).

For example, when an interval between the lowest threshold value SLTH and the highest threshold value SHTH is excessively wide, a corresponding actuator meaninglessly provides continuous vibration, and therefore, the precision of a tactile stimulation may be lowered. Also, when the interval between the lowest threshold value SLTH and the highest threshold value SHTH is excessively narrow, a target sound effect or the like cannot be detected, and therefore, a meaningful tactile stimulation may not be provided. Thus, in accordance with this embodiment, an appropriate lowest threshold value SLTH and an appropriate highest threshold value SHTH are provided. Accordingly, a meaningful tactile stimulation can be provided, and convenience of a user can also be provided.

Also, in accordance with this embodiment, the lowest threshold value SLTH and the highest threshold value SHTH can be adaptively changed in real time.

In accordance with an embodiment, the automatic setting unit 96 may change the lowest threshold value SLTH and the highest threshold value SHTH within a range limited by the lowest threshold value SLTH and the highest threshold value SHTH, which are predetermined by the user. Accordingly, an excessively quiet sound (e.g., a low background sound), an excessively loud sound (e.g., an explosion sound at a close place), and the like, which are intended by the user, are not converted into any tactile stimulations.

In addition, the automatic setting unit 96 may provide at least one of the highest threshold value SHTH, the lowest threshold value SLTH, and the gain value SFG through various algorithms.

For example, an algorithm may be implemented, which adjusts the highest threshold value SHTH and the lowest threshold value SLTH to fit a difference or ratio obtained by comparing an average of representative values RPV of a frequency band for last five seconds or a statistical value such as RMS with a reference value. For example, when an average of PSD values of a frequency band for last five seconds is −50 dB, and the reference value is −40 dB, the highest threshold value SHTH may be lowered by 10 dB to fit a corresponding difference or ratio.

In addition, an algorithm may be implemented, which sets the highest threshold value SHTH and the lowest threshold value SLTH, based on a confidence interval (CI) of the average value. For example, when a 95% confident interval of the average value is calculated as −45 dB to −55 dB and when a reference average value is −40 dB and a range of a reference 95% confident interval is 20 dB, a range of the calculated confidence interval is 10 dB, which is two times narrower than a reference range, and hence a difference between the highest threshold value SHTH and the lowest threshold value SLTH be narrowed by two times. Since the average is lower by 10 dB than a reference average, the highest threshold value SHTH and the lowest threshold value SLTH may be lowered by 10 dB.

In addition, an algorithm may be implemented, which uses not only a confidence interval representing a distribution of the average value but also a Prediction Interval (PI) allowing a distribution with respect to an individual sample value to be estimated. In particular, a non-parametric PI estimation may be used when a statistical distribution of an input signal cannot be predicted in advance. When the non-parametric PI estimation is used, an interval in which a current input can be located may be calculated with a probability of 95% by using past representative values RPV of each frequency band. For example, when a PI of p (e.g., 0.95 which means 95%) is to be calculated in a case where past representative values exist, n samples may be sequentially sorted from smallest one, and then j and k may be obtained as shown in the following Equations 2 and 3.

$$j=(n+1)*(1-p)/2 \quad \text{[Equation 2]}$$

$$k=n+1-j \quad \text{[Equation 3]}$$

When the j and k are obtained as described above, jth and kth values respectively become a lower limit and an upper limit of a p % prediction interval. These may be used as the lowest threshold value SLTH and the highest threshold value SHTH as they are, and the lowest threshold value SLTH and the highest threshold value SHTH may be scaled by using a difference between these values and an average of n samples, or the like.

For example, the automatic setting unit 96 may automatically generate the gain value SFG. For example, when an actuator is driven with a strength of a narrower range (30% to 70%) during a certain period even though the actuator can be driven with a strength of a specific range 0% to 100%, the actuator may be driven with a strength of wider range by adjusting the gain value SFG.

For example, an increase in the gain value SFG may cause the substantially same effect as a decrease in the lowest threshold value SLTH and the highest threshold value SHTH. In addition, a decrease in the gain value SFG may cause the substantially same effect as an increase in the lowest threshold value SLTH and the highest threshold value SHTH. That is, when data are mainly distributed out of a range of the lowest threshold value SLTH and the highest threshold value SHTH, which is set by the user, the automatic setting unit 96 may adjust the gain value SFG, to adjust the data out of the range to be within the range of the lowest threshold value SLTH and the highest threshold value SHTH. Accordingly, valid data can be increased. However, in this embodiment, the lowest threshold value SLTH and the highest threshold value SHTH, which are predetermined by the user, may be neglected.

Figure 26:
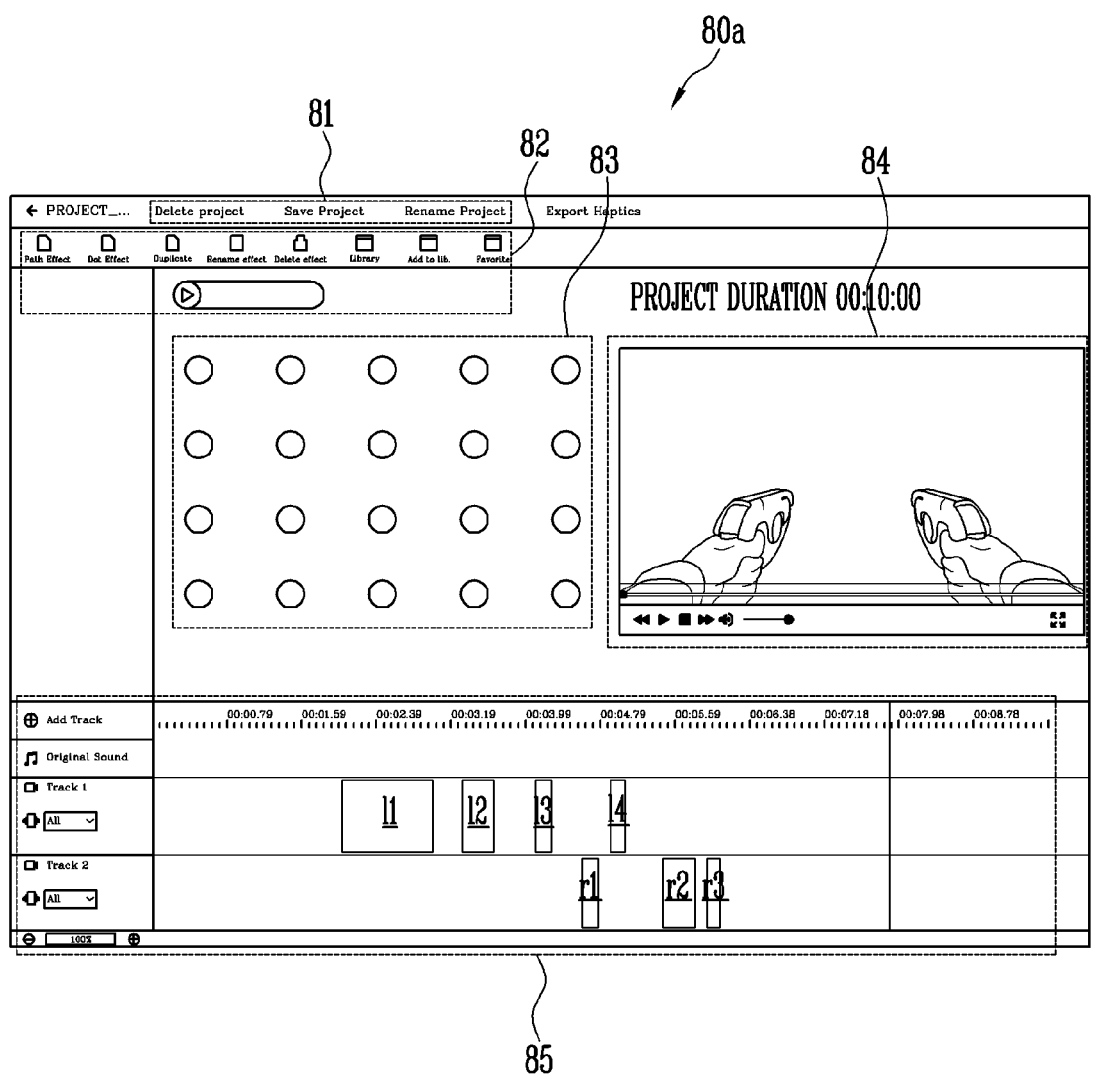
FIG. 26 is a view illustrating a user interface in accordance with another embodiment of the present invention.

FIG. 26 is a view illustrating a user interface in accordance with another embodiment of the present invention.

The user interface 80a may be generated by a program, and the program may be performed using a computer. The program may be recorded in a computer readable recording medium.

Referring to FIG. 26, the user interface 80a may include a project management area 81, an effect management area 82, an arrangement area 83, a reference content area 84, and a timeline area 85.

The project management area 81 may include a plurality of menus for project management. For example, the project management area 81 may include delete project, save project, rename project, and export haptics menus. An extracted tactile stimulation pattern may be used in the tactile stimulation providing apparatus 10.

The effect management area 82 may include path effect, dot effect, duplicate, rename effect, and delete effect menus.

The arrangement area 83 may include a plurality of virtual actuators. In FIG. 2, a plurality of virtual actuators of four rows and five columns are illustrated. However, in accordance with an embodiment, the number and arrangement of virtual actuators may be changed through manipulation of a menu. In accordance with an embodiment, a user may change the form of arrangement by dragging and dropping each actuator. In this case, unlike a quadrangular arrangement, a circular arrangement or an arrangement in another form may be implemented.

The reference content area 84 may include reference contents. The reference contents may be image data, sound data, image and sound combination data, and the like. The reference contents may have time series information. Time series information of a tactile stimulation pattern generated through a project may correspond to the time series information of the reference contents.

A plurality of tactile stimulation frames l1, l2, l3, l4, r1, r2, and r3 aligned with respect to the time series information of the reference contents are displayed in the timeline area 85. A size of each tactile stimulation frame may be in proportion to a size of a time for which an effect of the corresponding tactile stimulation frame is provided.

The timeline area 85 has at least one track, and may have a plurality of tracks in some embodiments. The plurality of tracks may respectively correspond to a plurality of tactile stimulation providing apparatuses. For example, it is predicted that the user will wear one tactile stimulation providing apparatus 10 on a left arm and wear another tactile stimulation providing apparatus 10 on a right arm, the timeline area 85 may be configured to have two tracks. In this case, a first track track 1 may correspond to the tactile stimulation providing apparatus worn on the left arm of the user. A second track track 2 may correspond to the tactile stimulation providing apparatus worn on the right arm of the user.

Each tactile stimulation frame may be dependent on a specific track. For example, tactile stimulation frames l1, l2, l3, and l4 may be dependent on the first track track 1, and tactile stimulation frames r1, r2, and r3 may be dependent on the second track track 2.

Figure 27:
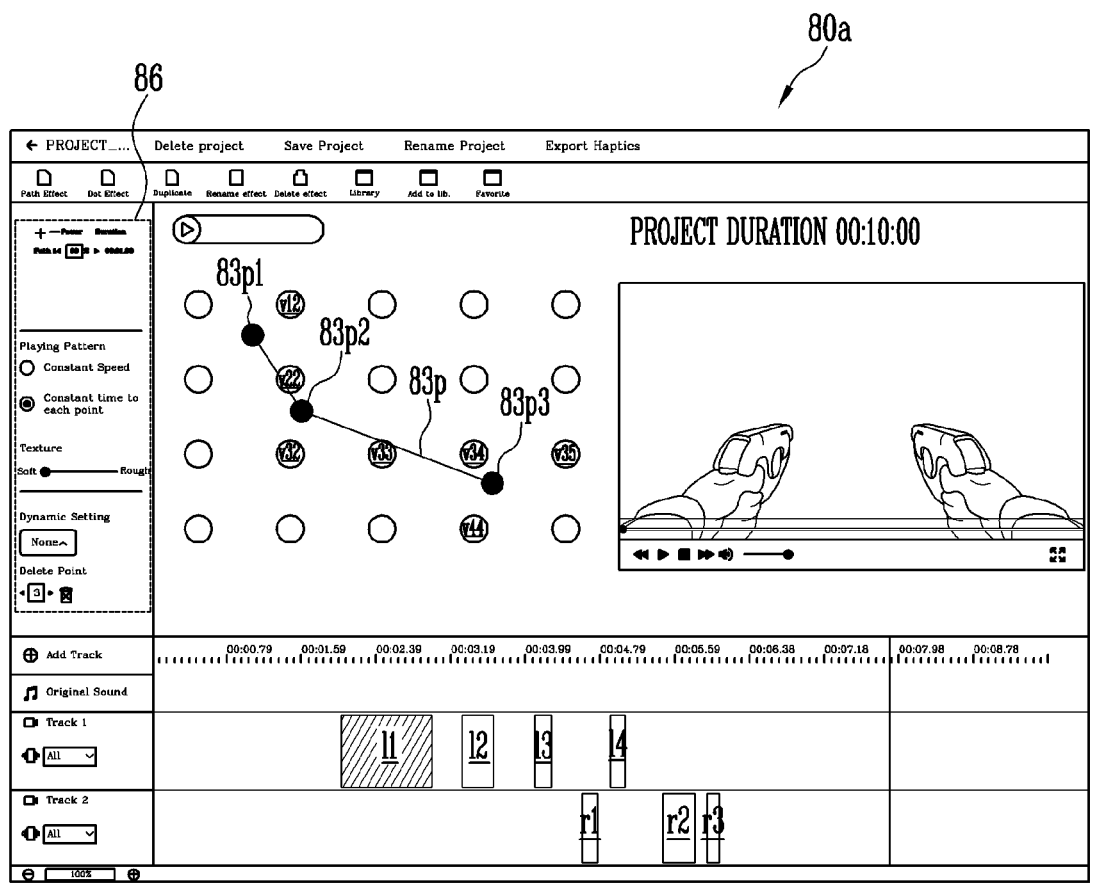
FIG. 27 is a view illustrating a path effect as a unit effect.

FIG. 27 is a view illustrating a path effect as a unit effect.

Referring to FIG. 27, the user interface 80a further includes a path effect setting area 86. The path effect setting area 86 may be displayed when the user selects the menu of Path Effect in the effect management area 82. When the menu of Path Effect is selected, the tactile stimulation frame I1 may be generated to correspond to the menu of Path Effect.

The user may select the menu of Path Effect in the effect management area 82 and draw a path 83p in the arrangement area 83. In an embodiment, the user may draw the path 83p by sequentially clicking a point 83p1, a point 83p2, and a point 83p3, using a mouse as an input device. In another embodiment, the user may draw the path 83p at a time by dragging, using the mouse as the input device. In another embodiment, when the input device is a touch pad, the user may draw the path 38p at a time by using a finger. A path effect path 1 may be generated in the path effect setting area 86, corresponding to the drawn path 83p. The path effect path 1 is a unit effect, and an application effect may be generated by combining one or a plurality of path effects or by combining dot effects which will be described later.

The tactile stimulation pattern generating apparatus 9 may generate a tactile stimulation pattern by setting a driving value to a plurality of virtual actuators corresponding to the path 83p on the user interface 80a. The driving value may include elements such as a driving strength, a driving frequency, a driving time, and a driving distance.

In accordance with an embodiment, a tactile stimulation pattern may be generated by setting a driving value to a virtual actuator closest to a point corresponding to each time of the path 83p. For example, a tactile stimulation pattern having the path effect path 1 may be generated by sequentially setting driving values to virtual actuators v12, v22, v32, v33, and v34.

In another embodiment, a tactile stimulation pattern may be generated by setting driving values to virtual actuators constituting a triangle surrounding a point corresponding to each time of the path 83p. For example, driving values may be simultaneously set to virtual actuators v34, v35, and v44 so as to provide a tactile stimulation to the point 83p3. The driving values of the virtual actuators constituting a triangle may be different from one another. A relatively large driving value may be set to the virtual actuator v34 close to the point 83p3, and relatively small driving values may be set to the virtual actuators v35 and v44 relatively distant from the point 83p3.

Although a case where the tactile stimulation frame I1 has one path effect path 1 is illustrated in FIG. 27, the user may insert an additional path effect into the tactile stimulation frame I1 by pressing a path effect addition button (plus button) in the path effect setting area 86. Also, the user may delete a previously generated path effect from the tactile stimulation frame I1 by pressing a path effect deletion button (minus button). When the tactile stimulation frame I1 has a plurality of path effects, the start time and end time of each path effect may be independently set. For example, the start time and end time of a first path effect may be set as 0.0 to 0.2 second, the start time and end time of a second path effect may be set as 0.4 to 0.7 second, and the start time and end time of a third path effect may be set as 0.6 to 1.0 second.

The user may adjust driving strengths of a plurality of virtual actuators of which driving values are set by adjusting power values in the path effect setting area 86. The sizes of graphic symbols displayed at the points 83p1, 83p2, and 83p3 may be changed according to power values. For example, when the power value increases, the size of the graphic symbol may increase. When the power value decreases, the size of the graphic symbol may decrease. Thus, the user can intuitively recognize the magnitude of vibration power corresponding to the size of a graphic symbol of each of the point 83p1, 83p2, and 83p3.

The user may adjust the time length of the path effect path 1 by adjusting a duration value in the path effect setting area 86. Also, the user may adjust the time length of the path effect path 1 by dragging a side of the tactile stimulation frame I1 corresponding to the timeline area 85.

The user may adjust a playing pattern in the path effect setting area 86. In an embodiment, when a constant speed is selected as the playing pattern, driving values of a plurality of virtual actuators may be set such that a tactile stimulation is applied at the constant speed from the start point 83p1 and the end point 83p3. In another embodiment, when a constant time of each point is selected as the playing pattern, driving values of a plurality of virtual actuators may be set such that a tactile stimulation is applied at a slow speed from the point 83p1 to the point 83p2 and then applied at a fast speed from the point 83p2 to the point 83p3.

The user may adjust a texture of the path effect path 1 in the path effect setting area 86. When the texture is almost soft, the connectivity between a plurality of actuators is improved, and therefore, smooth driving may be performed. When the texture is almost rough, the connectivity between a plurality of actuators is deteriorated, and therefore, intermittent driving may be performed.

The user may adjust a dynamic setting value in the path effect setting area 86. The dynamic setting value may include fade-in, fade-out, no setting, and the like.

Figure 28:
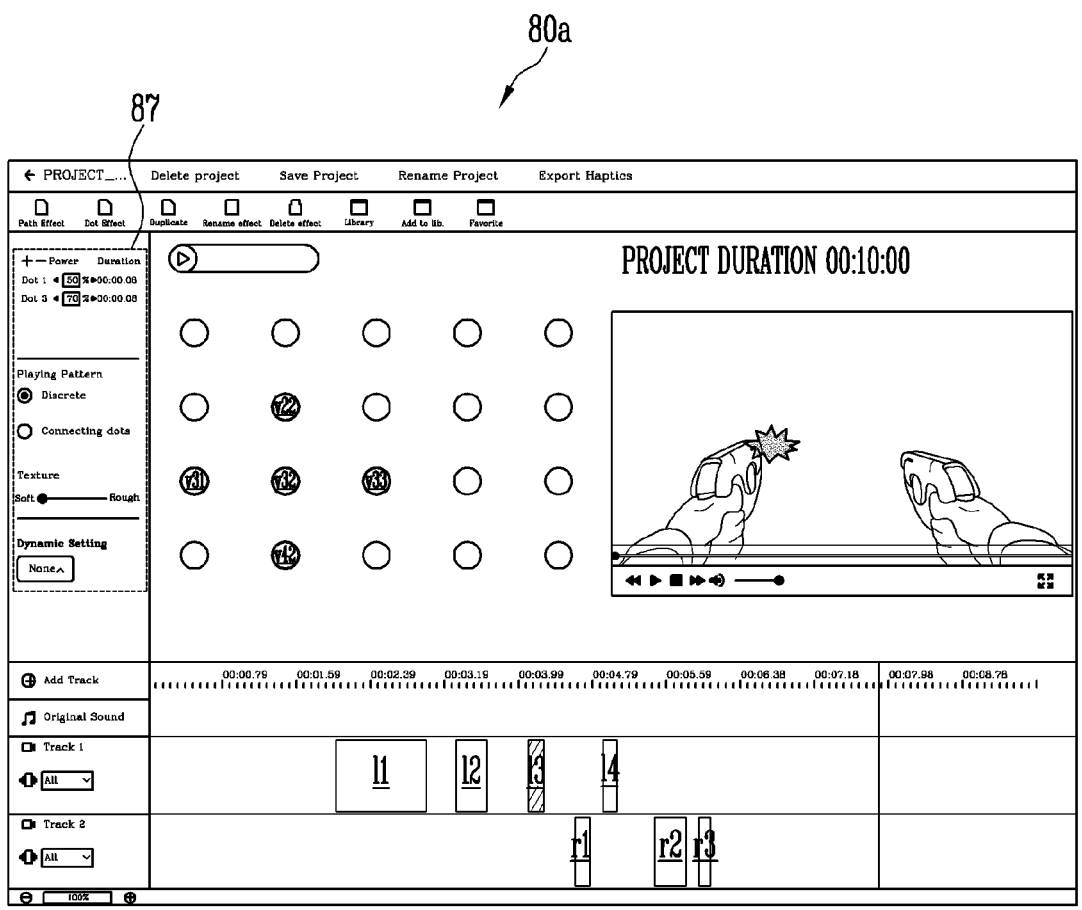
FIG. 28 is a view illustrating a dot effect as a unit effect.

FIG. 28 is a view illustrating a dot effect as a unit effect.

Referring to FIG. 28, the user interface 80a may further include a dot effect setting area 87. The dot effect setting area 87 may be displayed when the user selects the menu of Dot Effect in the effect management area 82. When the menu of Dot Effect is selected, the tactile stimulation frame I3 may be generated in the timeline area 85.

The user may select the menu of Dot Effect and select at least one virtual actuator v22, v31, v32, v33, and v42 in the arrangement area 83. In an embodiment, the user may click each of the actuators v22, v31, v32, v33, and v42 by using a mouse as an input device. A dot effect dot 1 may be generated in the dot effect setting area 87, corresponding to an input of the user. A dot effect dot 1 or dot 2 is a unit effect, and an application effect may be generated by combining one or a plurality of dot effects or by combining the dot effect with the above-described path effect.

A case where tactile stimulation frame I3 has two dot effects dot 1 and dot 2 is illustrated in FIG. 28. The user may insert an additional dot effect into the tactile stimulation frame I3 by pressing a dot effect addition button (plus button) in the dot effect setting area 87. The user may delete the previously generated dot effect dot 1 or dot 2 from the tactile stimulation frame I3 by pressing a dot effect deletion button (minus button). When the tactile stimulation frame I3 has a plurality of dot effects, the start time and end time of each dot effect may be independently set. For example, the start time and end time of a first dot effect may be set as 0.0 to 0.2 second, the start time and end time of a second dot effect may be set as 0.4 to 0.7 second, and the start time and end time of a third dot effect may be set as 0.6 to 1.0 second.

The user may adjust driving strengths of a plurality of virtual actuators v22, v31, v32, v33, and v42 of which driving values are set by adjusting power values in the dot effect setting area 87. The sizes of graphic symbols displayed at the virtual actuators v22, v31, v32, v33, and v42 may be changed according to power values. For example, when the power value increases, the size of the graphic symbol may increase. When the power value decreases, the size of the graphic symbol may decrease. Thus, the user can intuitively recognize the magnitude of vibration power corresponding to the size of a graphic symbol of each of the virtual actuators v22, v31, v32, v33, and v42.

The user may adjust the time length of the dot effect dot 1 or dot 2 by adjusting a duration value in the dot effect setting area 87. Also, the user may adjust the time length of the dot effect by dragging a side of the tactile stimulation frame I3 corresponding to the timeline area 85.

The user may adjust a playing pattern in the dot effect setting area 87. When the playing pattern has discrete dots, the first dot effect dot 1 and the second dot effect dot 2 may have driving values separated without connectivity between virtual actuators. When the playing pattern has connecting dots, the first dot effect dot 1 and the second dot effect dot 2 may have driving values where virtual actuators are temporarily connected while having a temporal connectivity as if the first dot effect dot 1 and the second dot effect dot 2 are one effect.

The user may adjust a texture in the dot effect setting area 87. The texture may be meaningful when the playing pattern has connecting dots, and the connectivity between the first dot effect dot 1 and the second dot effect dot 2 may become soft or become slightly rough. When the texture is set rough, a tactile stimulation having a feeling close to when the play pattern has discrete dots may be provided even when the playing pattern has connecting dots.

Figure 29:
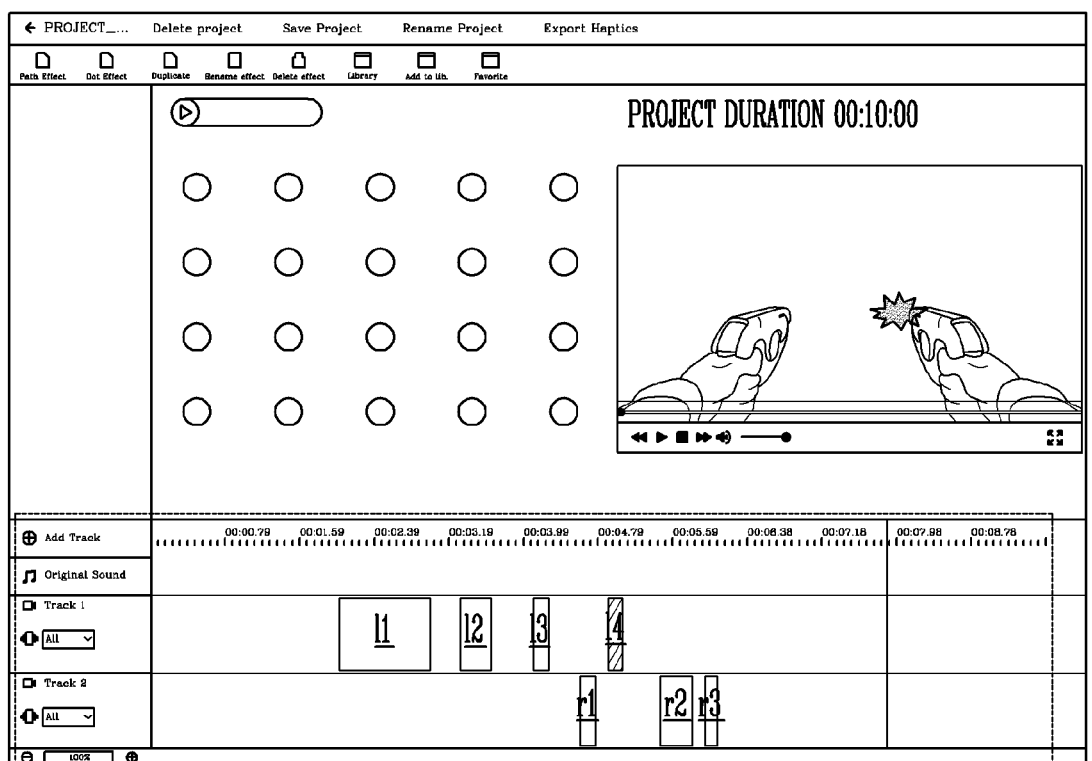
FIG. 29 is a view illustrating an arrangement of tactile stimulation frames in accordance with an embodiment of the present invention.

FIG. 29 is a view illustrating an arrangement of tactile stimulation frames in accordance with an embodiment of the present invention.

As described above, the tactile I1 and I3 may be frames directly produced by the user, using a mouse or the like. However, the tactile stimulation frame I4 is not a frame produced by the user, but may be a frame automatically generated by the tactile stimulation pattern generating apparatus 9, based on the first audio data. For example, when a gunshot bangs at a right side, any driving strength values may not be given to virtual actuators in the tactile stimulation frame I4 of the first track track1 interlocked with the tactile stimulation providing apparatus 10 worn on the left arm of the user. For example, the driving strength values of the virtual actuators in the tactile stimulation frame I4 may all be 0.

In accordance with this embodiment, the timeline area 85 may include a first tactile stimulation frame based on the first audio data and a second tactile stimulation frame based on the second audio data. The first tactile stimulation frame may be dependent on the first track. The second tactile stimulation frame may be dependent on the second track.

Although the present invention has been described with reference to exemplary embodiments illustrated in the drawings for illustrative purposes, those skilled in the art will appreciate that various modifications and equivalent embodiments are possible, without departing from the scope and spirit of the invention. Accordingly, the substantial technical protection scope of the present invention will be defined by the appended claims.

The invention claimed is:

1. A tactile stimulation providing device comprising:
a tactile stimulation pattern generating part configured to generate n first actuator strength values corresponding to representative values of frequency bands of first audio data and m second actuator strength values corresponding to representative values of frequency bands of second audio data; and
a tactile stimulation providing part including p actuators, the tactile stimulation providing apparatus driving the p actuators, based on the n first actuator strength values and the m second actuator strength values,
wherein the n, m, and p are integers greater than 1,
wherein the first audio data includes information on a first direction,
wherein the second audio data includes information on a second direction different from the first direction,
wherein the tactile stimulation pattern generating part includes a data converter configured to convert the first audio data and the second audio data of a time domain respectively into first converted data and a second converted data of a frequency domain,
wherein the tactile stimulation pattern generating part further includes a band representative value calculator configured to calculate the representative values of the frequency bands with respect to each of the first converted data and the second converted data, and
wherein the representative values are based on valid data which are greater than a lowest threshold value of each of the frequency bands.

2. The tactile stimulation providing device of claim 1, wherein the p is the same as or smaller than a value obtained by adding up the n and m.

3. The tactile stimulation providing device of claim 1,
wherein an actuator corresponding to first position information corresponding to the first direction is driven based on at least one of the first actuator strength values, and
wherein an actuator corresponding to second position information corresponding to the second direction is driven based on at least one of the second actuator strength values.

4. The tactile stimulation providing device of claim 1, wherein the representative values are based on valid data which are greater than the lowest threshold value of each of the frequency bands and are smaller than a highest threshold value of each of the frequency bands.

5. The tactile stimulation providing device of claim 1, wherein the first audio data corresponds to data of a first channel of stereo audio data, and
the second audio data corresponds to data of a second channel of the stereo audio data.

6. The tactile stimulation providing device of claim 1, wherein the first audio data corresponds to data of a first channel of surround audio data having three or more channels, and
the second audio data corresponds to data of a second channel of the surround audio data.

7. The tactile stimulation providing device of claim 1, wherein at least one actuator among the p actuators is driven based on at least one of the n first actuator strength values and at least one of the m second actuator strength values.

8. The tactile stimulation providing device of claim 1, wherein at least one actuator among the p actuators is driven based on at least two of the n first actuator strength values.

9. The tactile stimulation providing device of claim 1, wherein at least two of the frequency bands overlap with each other in at least a partial range.

10. The tactile stimulation providing device of claim 1, wherein the tactile stimulation pattern generating part further includes an actuator strength calculator configured to calculate actuator strength values corresponding to the representative values.

11. The tactile stimulation providing device of claim 10, wherein the actuator strength calculator calculates the actuator strength values to become smaller as the representative values become smaller, and calculates the actuator strength values to become smaller as the representative values become larger.

12. The tactile stimulation providing device of claim 10, wherein, in the actuator strength calculator, a relationship of the representative values and the actuator strength values includes a discontinuous function.

13. The tactile stimulation providing device of claim 4, wherein a first lowest threshold value corresponding to a first frequency band among the frequency bands is different from a second lowest threshold value corresponding to a second frequency band among the frequency bands, and
wherein a first highest threshold value corresponding to the first frequency band is different from a second highest threshold value corresponding to the second frequency band.

14. The tactile stimulation providing device of claim 10, wherein the tactile stimulation pattern generating part further includes an actuator strength attenuator configured to gradually attenuate the actuator strength values, when the actuator strength values are maintained for a certain time or more.

15. The tactile stimulation providing device of claim 14, wherein the tactile stimulation pattern generating part further includes an actuator strength merger configured to generate one actuator strength value by merging two or more actuator strength values mapped to one actuator.

16. The tactile stimulation providing device of claim 1, wherein the tactile stimulation pattern generating part further includes an automatic setting unit configured to set the lowest threshold value based on a previous representative value of each of the frequency bands.

17. The tactile stimulation providing device of claim 16, wherein the automatic setting unit is further configured to set a highest threshold value of each of the frequency bands based on the previous representative value of each of the frequency bands.

18. The tactile stimulation providing device of claim 16, wherein the automatic setting unit is further configured to set a gain value of each of the frequency bands based on a strength of an actuator during a previous period.

19. The tactile stimulation providing device of claim 1, wherein the tactile stimulation pattern generating part further includes an automatic setting unit configured to set the lowest threshold value and a highest threshold value of each of the frequency bands within a range limited by a user lowest threshold value and a user highest threshold value.

20. The tactile stimulation providing device of claim 19, wherein the automatic setting unit is further configured to set a gain value of each of the frequency bands to adjust data out of the range to be within the range.

21. The tactile stimulation providing device of claim 16, wherein the lowest threshold value is set based on a confidence interval algorithm or a prediction interval algorithm.

22. The tactile stimulation providing device of claim 16, wherein the lowest threshold value is set based on a non-parametric prediction interval estimation.

23. A tactile stimulation providing device comprising:
a tactile stimulation pattern generating part configured to generate n first actuator strength values corresponding to representative values of frequency bands of first audio data and m second actuator strength values corresponding to representative values of frequency bands of second audio data; and
a tactile stimulation providing part including p actuators, the tactile stimulation providing apparatus driving the p actuators, based on the n first actuator strength values and the m second actuator strength values,
wherein the n, m, and p are integers greater than 1,
wherein the first audio data includes information on a first direction,
wherein the second audio data includes information on a second direction different from the first direction,
wherein the representative values are based on valid data which are greater than a lowest threshold value of each of the frequency bands, and
wherein the tactile stimulation pattern generating part includes an automatic setting unit configured to set the lowest threshold value based on a previous representative value of each of the frequency bands.

* * * * *